(12) United States Patent
Watanabe et al.

(10) Patent No.: US 10,503,044 B1
(45) Date of Patent: Dec. 10, 2019

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Yutaka Watanabe, Kanagawa (JP); Hiroshi Sakai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/415,306

(22) Filed: May 17, 2019

(30) Foreign Application Priority Data

May 21, 2018 (JP) ................................ 2018-097135

(51) Int. Cl.
*G02F 1/29* (2006.01)
*H04N 5/232* (2006.01)
*H04N 5/225* (2006.01)

(52) U.S. Cl.
CPC ............. *G02F 1/29* (2013.01); *H04N 5/2254* (2013.01); *H04N 5/23212* (2013.01); *G02F 2001/294* (2013.01)

(58) Field of Classification Search
CPC .... G02F 1/29; H04N 5/2254; H04N 5/23212; H04N 5/232133
See application file for complete search history.

(56) References Cited

U.S. PATENT DOCUMENTS

| | | | | |
|---|---|---|---|---|
| 2009/0268080 | A1* | 10/2009 | Song .................. | H04N 5/23212 348/349 |
| 2010/0177376 | A1 | 7/2010 | Arnold et al. | |
| 2014/0009572 | A1* | 1/2014 | Matsumoto ........ | H04N 5/23238 348/36 |
| 2018/0286020 | A1* | 10/2018 | Kawai ................ | G02B 27/0075 |
| 2018/0314033 | A1 | 11/2018 | Sakai et al. | |
| 2018/0314041 | A1 | 11/2018 | Igasaki et al. | |
| 2018/0314042 | A1 | 11/2018 | Igasaki et al. | |
| 2019/0075247 | A1* | 3/2019 | Vink .................... | G02B 21/367 |

OTHER PUBLICATIONS

U.S. Appl. No. 16/415,190 to Hiroshi Sakai et al., filed May 17, 2019.
U.S. Appl. No. 16/414,148 to Hiroshi Sakai et al., filed May 16, 2019.

* cited by examiner

*Primary Examiner* — Nicholas G Giles
(74) *Attorney, Agent, or Firm* — Greenblum & Bernstein, P.L.C.

(57) ABSTRACT

A variable focal length lens device includes an image-detection-condition setting unit configured to set image detection conditions. The image-detection-condition setting unit is configured to set, as image detection conditions, a combined mode of repeating an image detection loop including at least one multi-plane-image-detecting operation and at least one single-plane-image-detecting operation. In the multi-plane-image-detecting operation, a plurality of values of the focal length, at each of which the image detection is performed, are set in one cycle in which the focal length of the variable focal length lens is varied. In the single-plane-image-detecting operation, a single value of the focal length, at which the image detection is performed, is set in one cycle in which the focal length of the variable focal length lens is varied.

4 Claims, 24 Drawing Sheets

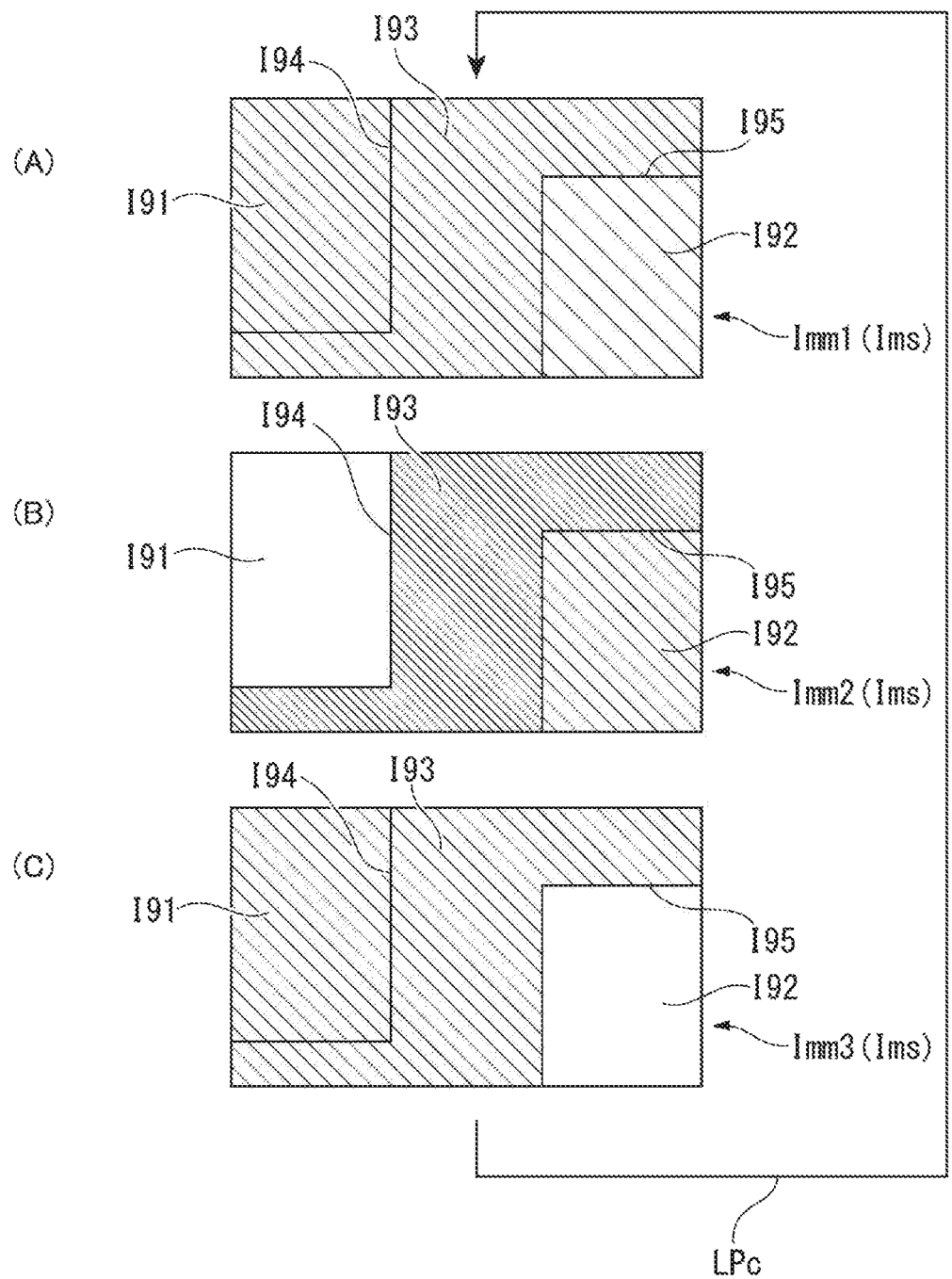

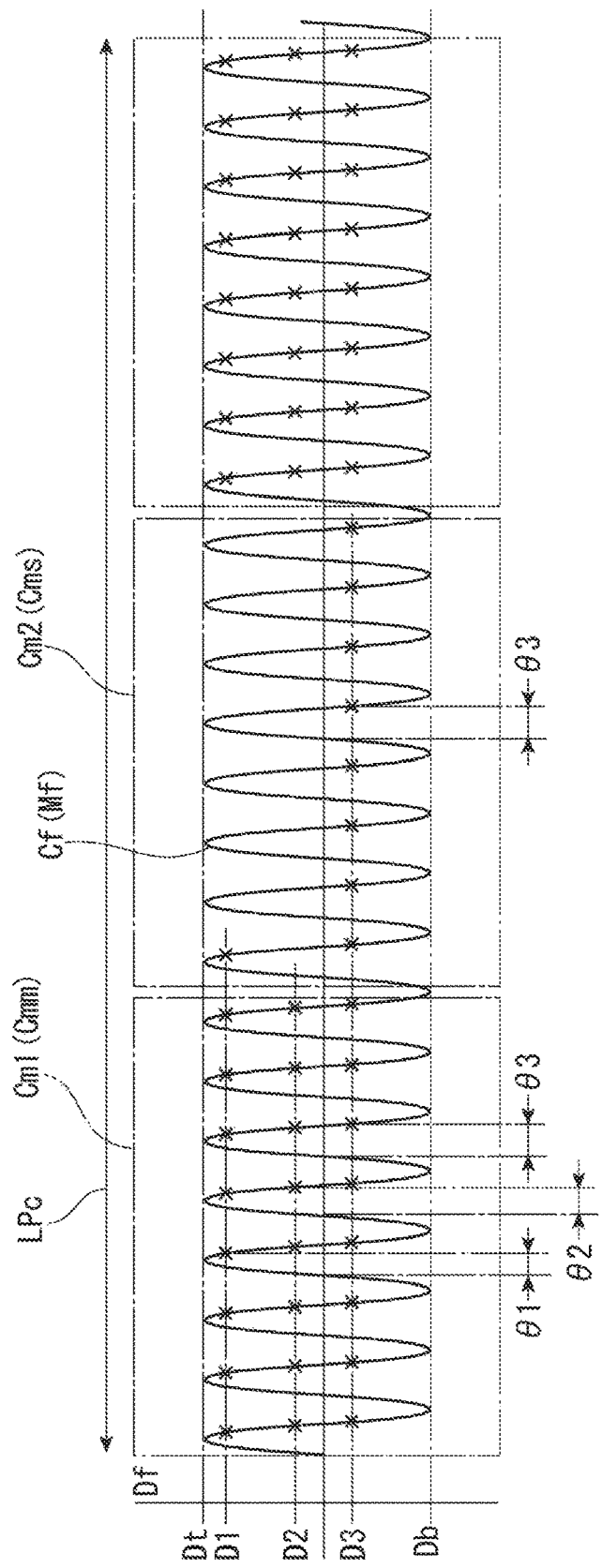

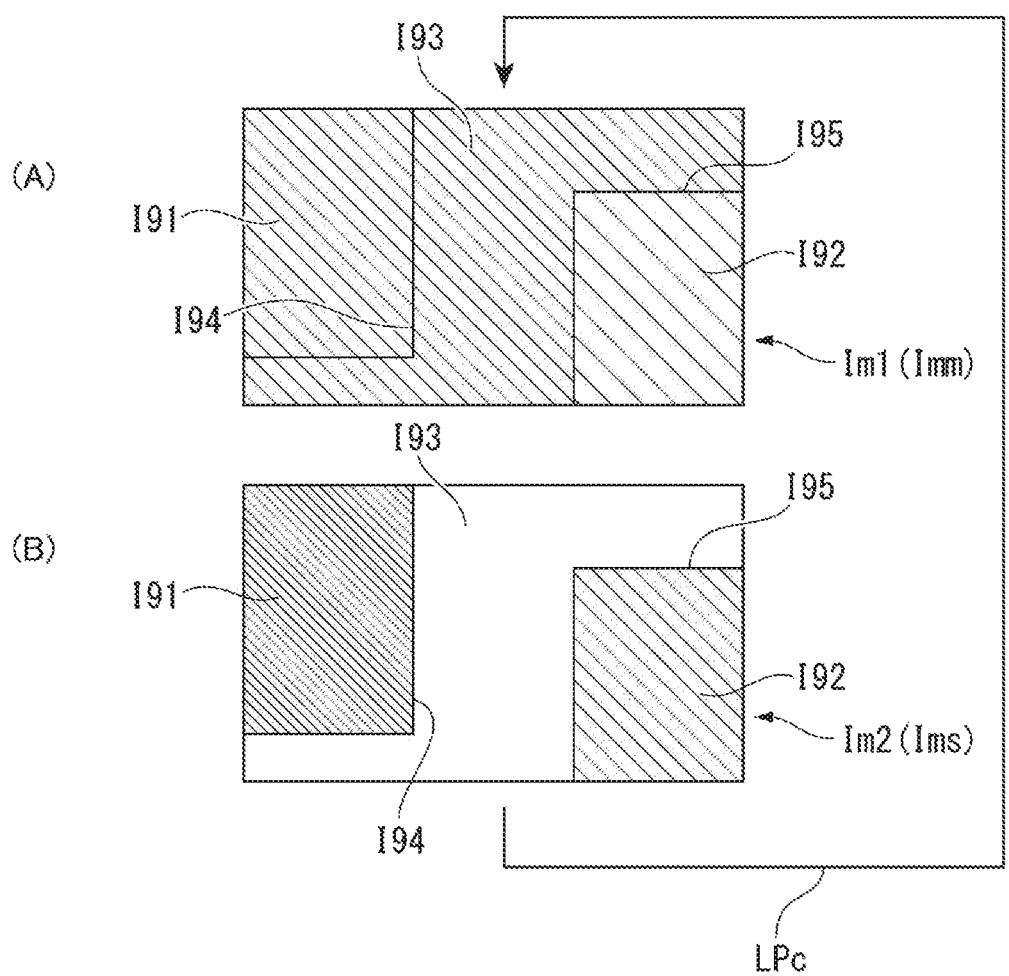

VARIABLE FOCAL LENGTH LENS DEVICE AND VARIABLE FOCAL LENGTH LENS CONTROL METHOD

The entire disclosure of Japanese Patent Application No. 2018-097135 filed May 21, 2018 is expressly incorporated by reference herein.

TECHNICAL FIELD

The present invention relates to a variable focal length lens device and a variable focal length lens control method.

BACKGROUND ART

A variable focal length lens device employing, for instance, a liquid lens system (occasionally simply referred to as a "lens system" hereinafter) based on a principle disclosed in Patent Literature 1 (U.S. Patent Application Publication No. 2010/0177376) has been developed.

The liquid lens system includes a cylindrical oscillator made of a piezoelectric material that is immersed in a transparent liquid. When an alternating-current (AC) voltage is applied to an inner circumferential surface and an outer circumferential surface of the oscillator of the liquid lens system, the oscillator expands and contracts in a thickness direction thereof to oscillate the liquid inside the oscillator. Then, when the frequency of the applied voltage is tuned to an intrinsic frequency of the liquid, a concentric standing wave is created in the liquid to form concentric regions of different refractive indexes around a center axis of the oscillator. When light is introduced into the oscillator along a center axis thereof in this state, the light follows a diffusing or converging path according to the refractive index of each of the concentric regions.

The variable focal length lens device includes the above-described liquid lens system and a focusing objective lens (e.g. a typical convex lens or lens group), which are disposed on a common optical axis. The liquid lens system, which is a packaged liquid lens unit, is installed in the variable focal length lens device.

When a parallel light enters a typical objective lens, the light having passed through the lens is focused at a focus position located at a predetermined focal length from the lens. In contrast, when a parallel light enters the lens system disposed coaxially with the objective lens, the light is diverged or converged by the lens system, so that the light having passed through the objective lens is focused at a position closer or farther than the original focus position (i.e. the focus position without the lens system).

Accordingly, an amplitude of a drive signal (an AC voltage of a frequency forming a standing wave in the liquid inside the lens system) inputted to the lens system is increased or decreased in the variable focal length lens device, thereby controlling the focus position of the variable focal length lens device as desired within a predetermined range (i.e. a range with a predetermined variation width capable of being added to/subtracted from the focal length of the objective lens using the lens system). A sinusoidal AC signal is exemplarily used for the drive signal inputted to the lens system of the variable focal length lens device. When such a sinusoidal drive signal is inputted, the focal length (focus position) of the variable focal length lens device sinusoidally changes. At this time, when the amplitude of the drive signal is 0, the light passing through the lens system is not refracted and the focal length of the variable focal length lens device becomes equal to the focal length of the objective lens. When the amplitude of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sine wave of the drive signal to perform a pulsed illumination. By applying the pulsed illumination to an object while the pulsed illumination is focused on a predetermined value of the sinusoidally changing focal length, the image of the object at this focal length is detected. When the pulsed illumination is performed at a plurality of phases in one cycle and images are detected at timings corresponding to the phases, the images at a plurality of values of the focal length can be simultaneously obtained.

In the above variable focal length lens device, when the pulsed illumination and the image detection are performed at a single phase in one cycle (i.e., a single-plane-image-detecting operation), a detected image (a single-plane detected image) in focus on a single focusing surface (plane) at a focal length corresponding to the phase is obtained.

In the single-plane-image-detecting operation, an image of a part of a surface of the measurement target, in which the part is focused on the focusing surface, is taken as a clear image in focus. However, an image of a part out of the focusing surface (the part is within or beyond the focal length) in the surface of the measurement target is taken as an out-of-focus image.

When the pulsed illumination and the image detection are performed at a plurality of phases in one cycle (i.e., a multi-plane-image-detecting operation), images are sequentially detected at a plurality of values of the focal length corresponding to the phases and sequentially superimposed on each other into a single detected image (a multi-plane detected image). As a result, the image in focus on a plurality of focusing surfaces is obtainable.

However, in the multi-plane-image-detecting operation, although an image of a part of the measurement target, in which the part is in focus on the corresponding focusing surface, can be dearly taken in focus, the image of the part of the measurement target, in which the part is out of focus on the other focusing surfaces, is taken out of focus. Such image information on the focusing surfaces are superimposed on each other, which causes a clear image-quality to be deteriorated into, for instance, an image with blur surroundings of a clear edge.

Against such a deterioration in the image quality, in some cases, the above-described single-plane-image-detecting operation is sequentially performed at a plurality of values of the focal length (i.e., frame-by-frame image detecting operation).

Specifically, the single-plane-image-detecting operation is initially performed at a first value among the plurality of values of the focal length, subsequently the single-plane-image-detecting operation is performed at a second value, and the single-plane-image-detecting operation is repeated by the specified number of the focal length.

In such a frame-by-frame image detecting operation, the image detection at each of the values of the focal length is performed by the single-plane-image-detecting operation, so that the detected images are in focus to provide clear images.

However, since the frame-by-frame mode requires repetition of the single-plane-image-detecting operation by the specified number of the focal length, the image detection time is prolonged as the specified number of the focal length is increased.

SUMMARY OF INVENTION

An object of the invention is to provide a variable focal length lens device and a variable focal length lens method that are capable of providing a sufficient image-quality at a plurality of values of a focal length and shortening an image detection time.

According to an aspect of the invention, a variable focal length lens device includes: a variable focal length lens configured to periodically vary a focal length; an image detector configured to execute an image detection of a measurement target through the variable focal length lens; a lens controller configured to control the image detector to execute the image detection on a basis of image detection conditions regarding the focal length of the variable focal length lens; and an image-detection-condition setting unit configured to set the image detection conditions in the lens controller, in which the image-detection-condition setting unit is configured to set, as the image detection conditions, a combined mode of repeating an image detection loop including at least one multi-plane-image-detecting operation and at least one single-plane-image-detecting operation, in the multi-plane-image-detecting operation, the image-detection-condition setting unit is configured to set a plurality of values of the focal length, at each of which the image detection is performed, in one cycle in which the focal length of the variable focal length lens is varied, and in the single-plane-image-detecting operation, the image-detection-condition setting unit is configured to set a single value of the focal length, at which the image detection is performed, in one cycle in which the focal length of the variable focal length lens is varied.

According to the above aspect of the invention, the lens controller controls the variable focal length lens based on the image detection conditions set by the image-detection-condition setting unit to perform the image detection with the image detector.

At this time, when the combined mode is set as the image detection conditions, the image detector repeatedly executes the image detection loop including at least one multi-plane-image-detecting operation and at least one single-plane-image-detecting operation.

In the combined mode for the image detection, for instance, at three values of the focal length in one cycle, the image detector repeatedly executes the image detection loop including the multi-plane-image-detecting operation in which three values of the focal length are set in one cycle, and two single-plane-image-detecting operations, in each of which a single value of the focal length is set.

An image detected by such a combined mode includes image information in focus at all the values of the focal length by the multi-plane-image-detecting operation. However, the detected image in the combined mode is not necessarily clear since the image information include image information out of focus. On the other hand, the single-plane-image-detecting operations provide clear images at two values of the focal length.

Accordingly, in the combined mode, the multi-plane-image-detecting operation can provide the same results as a typical multi-plane mode and the single-plane-image-detecting operation can provide a high image-quality unobtainable by a typical multi-plane-image-detecting operation.

A typical frame-by-frame mode requires repetition of the single-plane-image-detecting operation by the set number of the focal length, so that the image detection time is prolonged as the set number of the focal length is increased. However, the combined mode according to the above aspect of the invention can reduce the number of the single-plane-image-detecting operation to shorten the image detection time. Specifically, when an image detection in a typical frame-by-frame mode is performed at five values of the focal length, it takes time to perform the single-plane-image-detecting operations by five frames. In contrast, in the combined mode, for instance, when the image detection is performed at five values of the focal length, in which a clear image is required at only two of the five values of the focal length, it is only necessary to obtain image information at the five values of the focal length by the multi-plane-image-detecting operation and perform two single-plane-image-detecting operations. The combined mode can thus be finished within a period of time required for three frames in total.

Thus, the variable focal length lens device according to the above aspect of the invention can provide a sufficient image-quality at a plurality of values of the focal length and shorten the image detection time.

In the above arrangement, preferably, the image-detection-condition setting unit is configured to select one of a plurality of image detection modes and set the selected one in the lens controller, the image detection modes include the combined mode, a single-plane mode, a multi-plane mode, and a frame-by-frame mode, in the single-plane mode, an image detection loop comprising only the single-plane-image-detecting operation in which the single value of the focal length is specified is repeatedly executed, in the multi-plane mode, an image detection loop comprising only the multi-plane-image-detecting operation in which the plurality of values of the focal length are specified is repeatedly executed, and in the frame-by-frame mode, an image detection loop comprising a plurality of the single-plane-image-detecting operations in which the values of the focal length are different from each other is repeatedly executed.

In this arrangement, the combined mode according to the aspect of the invention can be selected as the image detection mode, and a typical single-plane mode, multi-plane mode, frame-by-frame mode can also be selected. In this arrangement, the advantages of the combined mode according to the aspect of the invention can be obtained while the same image-detecting operation as a typical one can be reliably performed as needed.

In the above arrangement, the variable focal length lens preferably includes: a liquid lens unit whose refractive index is varied in response to an inputted drive signal; and an objective lens disclosed on an optical axis coaxial with the liquid lens unit.

With this arrangement, a basic image can be formed by the objective lens and the focal length can be changed by the liquid lens unit. The use of the liquid lens unit eliminates a mechanical means for varying the focal length, so that a structure of the device can be simplified. The liquid lens unit can periodically vary the focal length at a speed as high as several tens kilohertz and can easily provide the multi-plane detected image in which images at a plurality of values of the focal length are superimposed. Accordingly, the liquid lens unit is the most suitable for the variable focal length lens according to the invention.

According to another aspect of the invention, a method of controlling a variable focal length lens device, the variable focal length lens device including: a variable focal length lens configured to periodically vary a focal length; an image detector configured to execute an image detection of a measurement target through the variable focal length lens; a lens controller configured to control the image detector to execute the image detection on a basis of image detection conditions regarding the focal length of the variable focal length lens; and an image-detection-condition setting unit configured to set the image detection conditions in the lens controller, includes: as the image detection conditions, setting a combined mode of repeating an image detection loop comprising at least one multi-plane-image-detecting operation and at least one single-plane-image-detecting operation; in the multi-plane-image-detecting operation, setting a plurality of values of the focal length, at each of which the image detection is performed, in one cycle in which the focal length of the variable focal length lens is varied; and in the single-plane-image-detecting operation, setting a single value of the focal length, at which the image detection is performed, in one cycle in which the focal length of the variable focal length lens is varied.

The variable focal length lens control method according to the another aspect of the invention can provide the same advantages as described above of the variable focal length lens device according to the above aspect of the invention.

According to the above aspects of the invention, a variable focal length lens device and a variable focal length lens method that are capable of providing a sufficient image-quality at a plurality of values of the focal length and shortening an image detection time can be provided.

BRIEF DESCRIPTION OF DRAWING(S)

FIG. 1 schematically shows an exemplary embodiment of the invention.

FIG. 2 schematically shows a configuration of a liquid lens unit in the exemplary embodiment.

FIG. 3 schematically shows an oscillation state of the liquid lens unit in the exemplary embodiment.

FIG. 4 schematically shows a focal length of the liquid lens unit in the exemplary embodiment.

Figure 8:
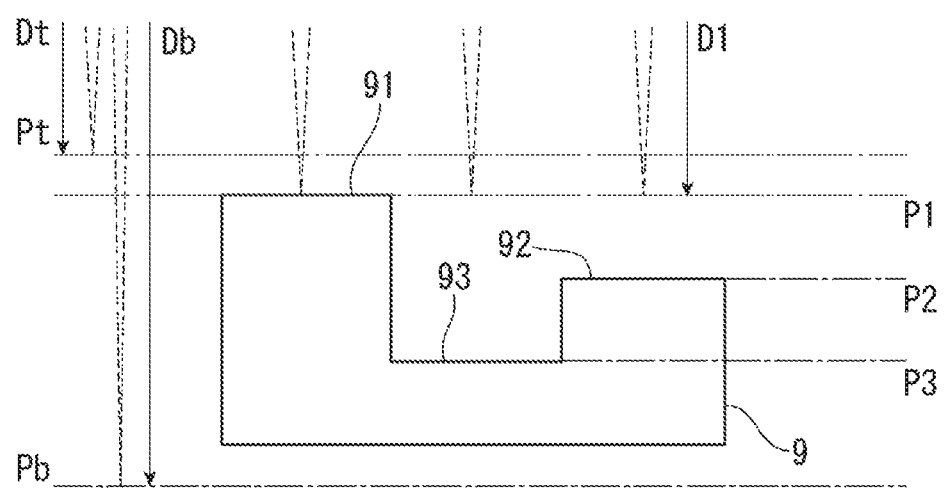

FIG. 8 schematically shows a focusing state in the single-plane mode in the exemplary embodiment.

Figure 9:
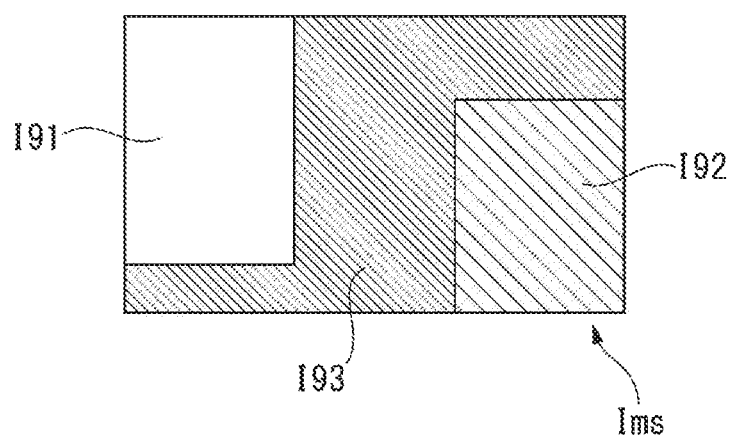

FIG. 9 schematically shows a detected image in the single-plane mode in the exemplary embodiment.

Figure 10:
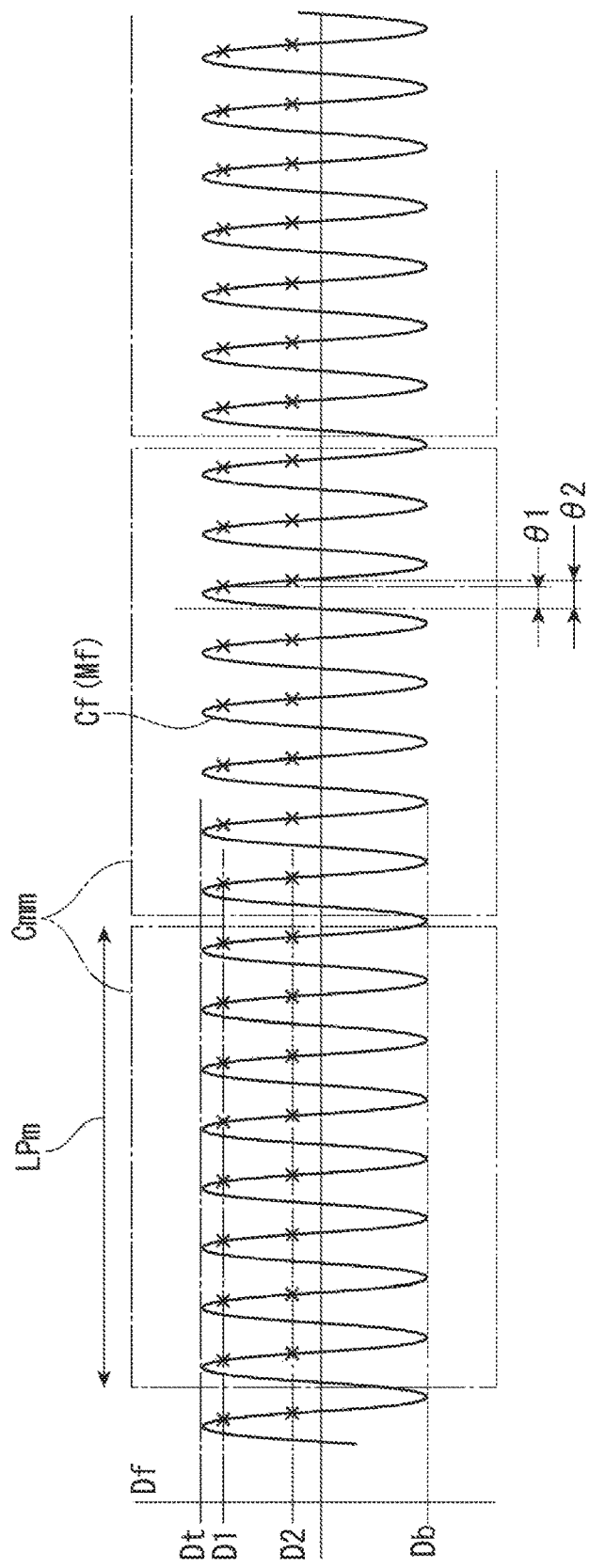

FIG. 10 is a graph showing a multi-plane mode in the exemplary embodiment.

Figure 11:
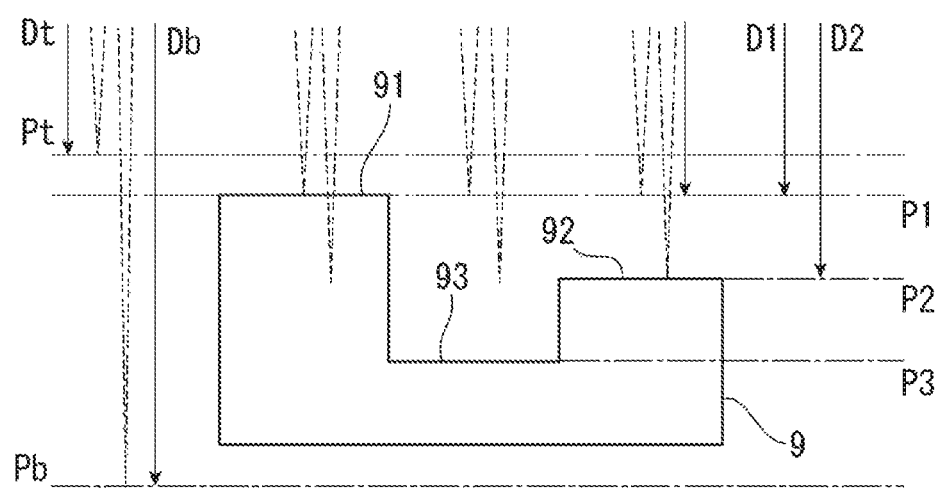

FIG. 11 schematically shows a focusing state in the multi-plane mode.

Figure 12:
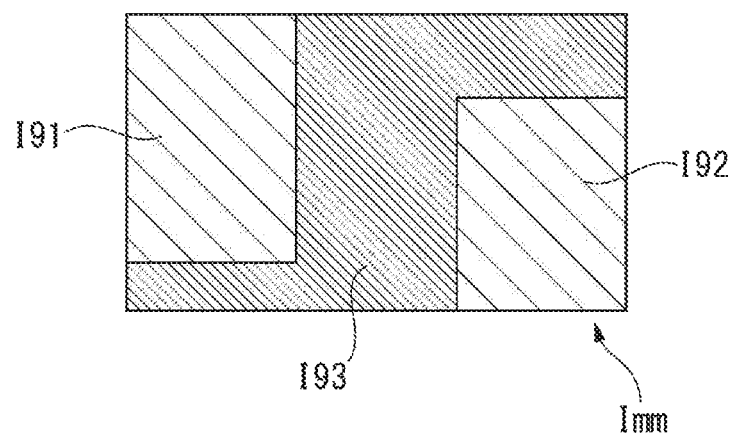

FIG. 12 schematically shows a detected image in the multi-plane mode.

Figure 13:
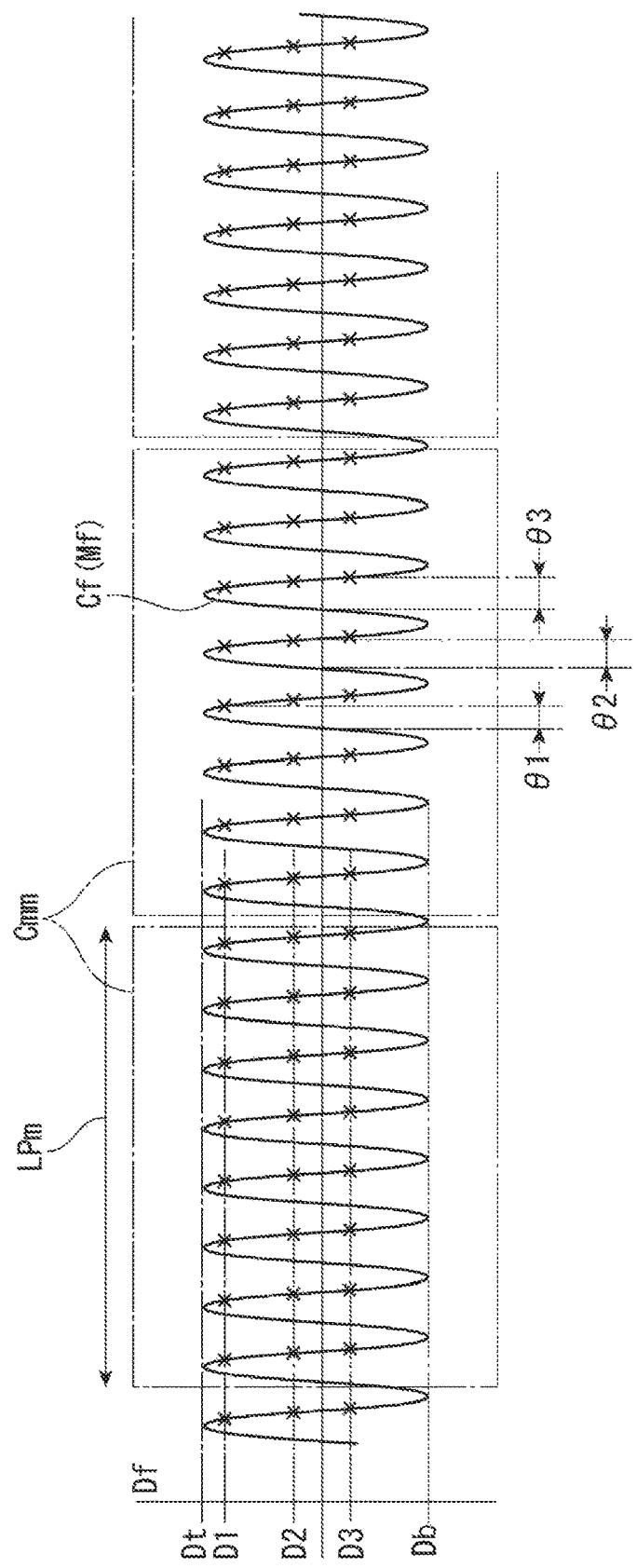

FIG. 13 is a graph showing another multi-plane mode in the exemplary embodiment.

Figure 14:
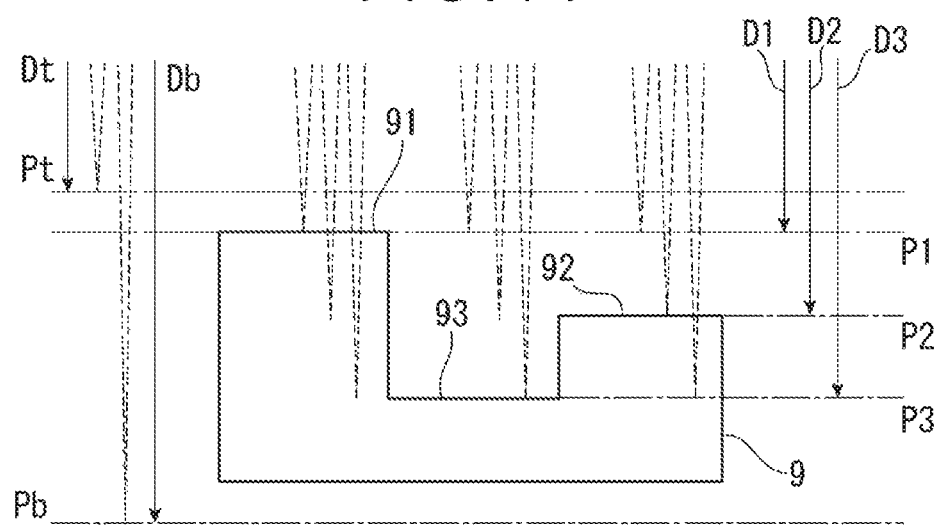

FIG. 14 schematically shows a focusing state in the another multi-plane mode.

Figure 15:
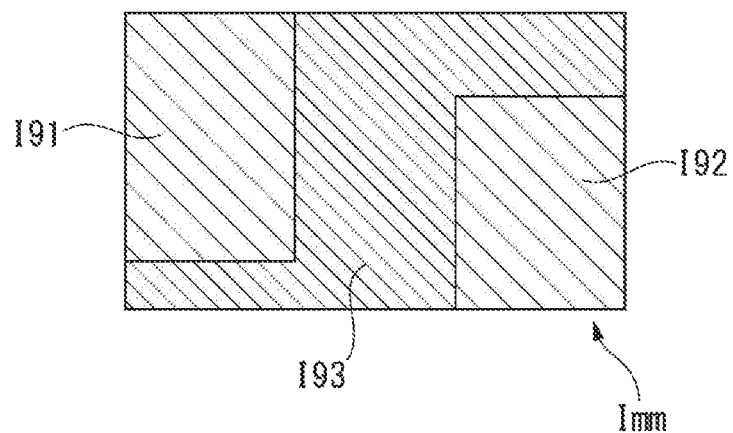

FIG. 15 schematically shows a detected image in the multi-plane mode.

Figure 16:
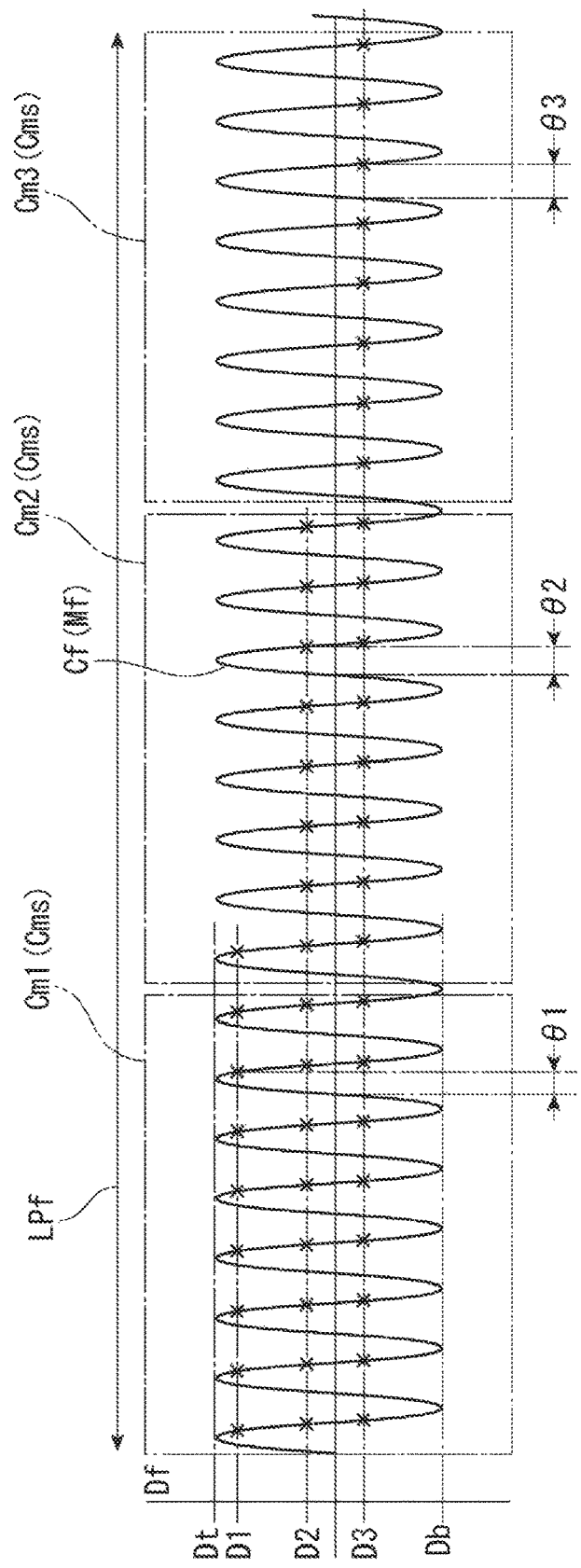

FIG. 16 is a graph showing a frame-by-frame mode in the exemplary embodiment.

Figure 17A:
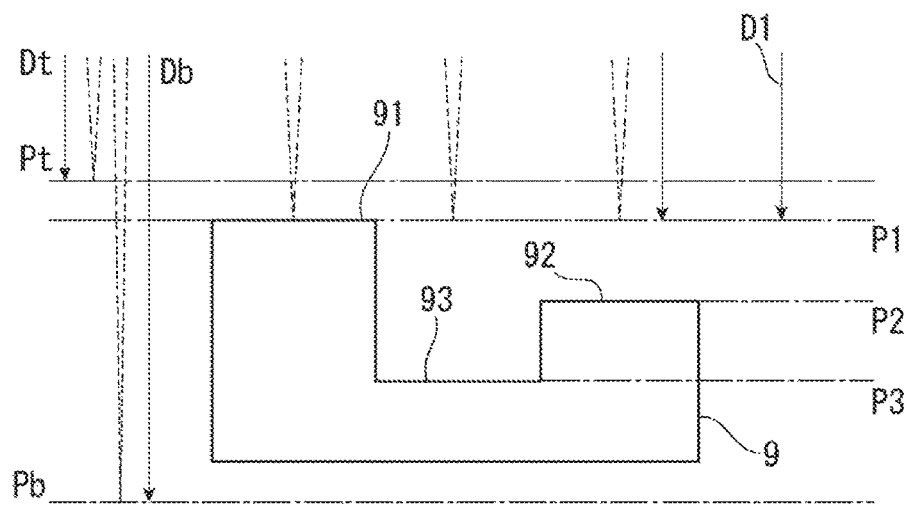

FIG. 17A schematically shows a focusing state in the frame-by-frame mode.

Figure 17B:
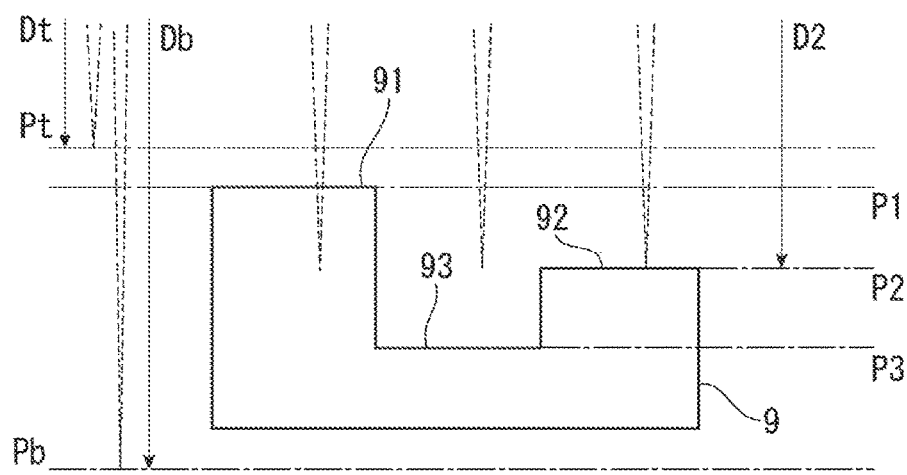

FIG. 17B schematically shows another focusing state in the frame-by-frame mode.

Figure 17C:
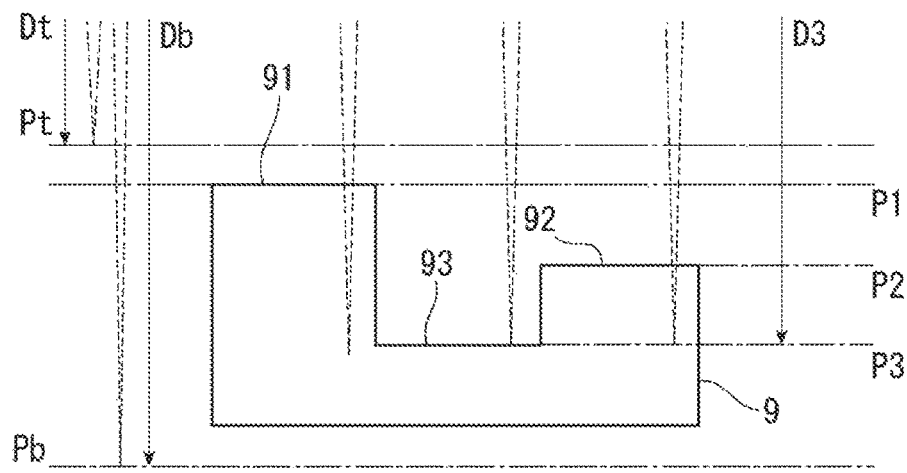

FIG. 17C schematically shows still another focusing state in the frame-by-frame mode.

Figure 18:
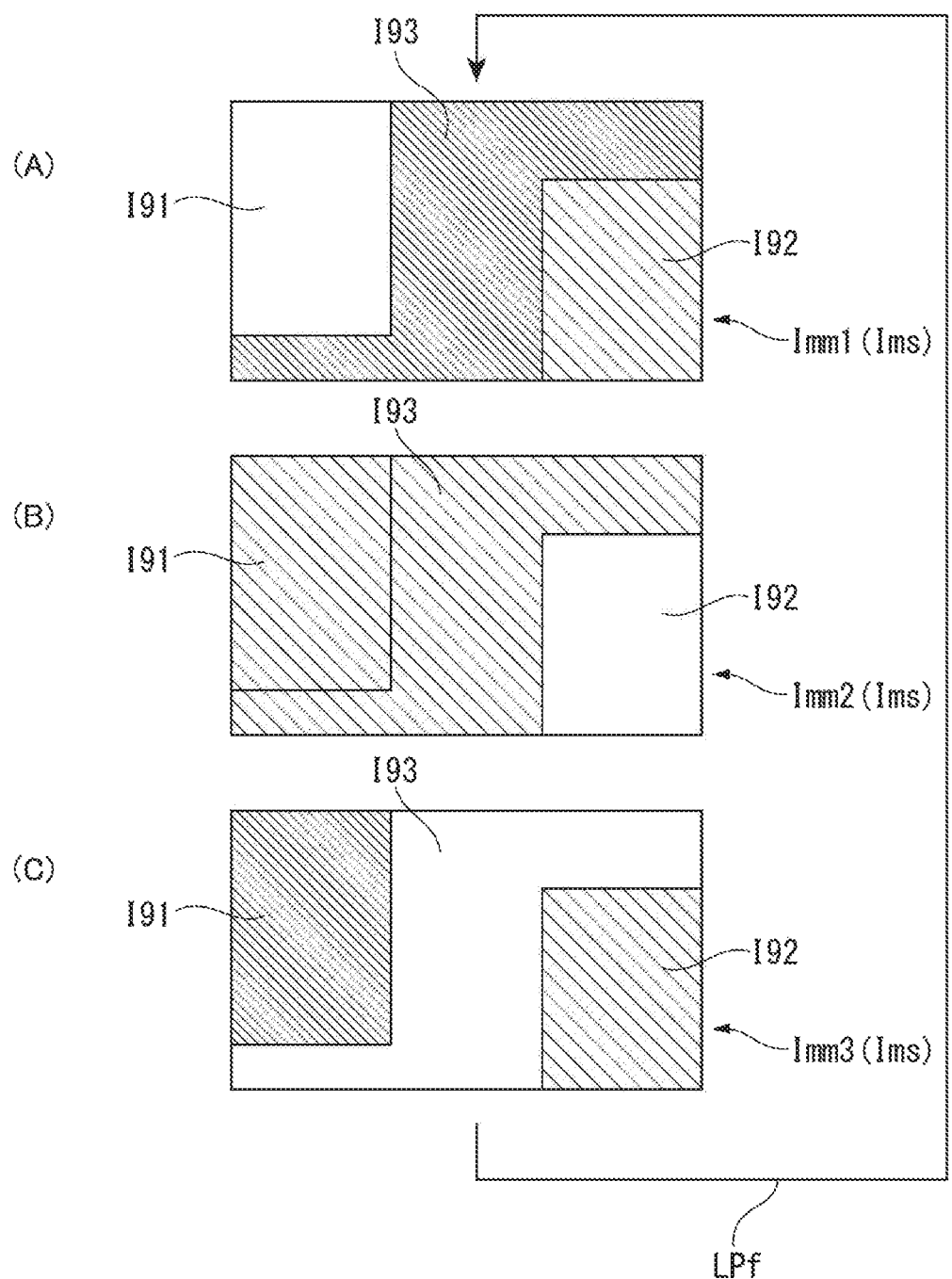

FIG. 18 schematically shows detected images in the frame-by-frame mode.

Figure 19:
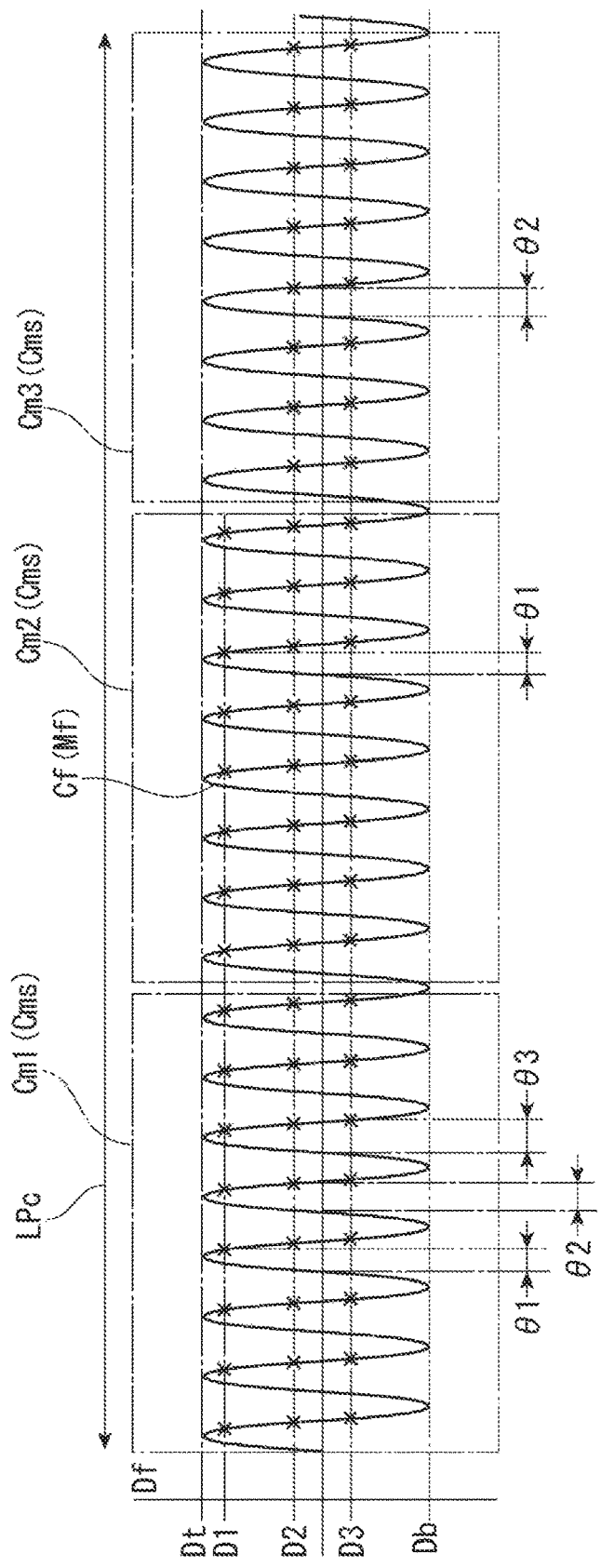

FIG. 19 is a graph showing a combined mode in the exemplary embodiment.

Figure 20A:
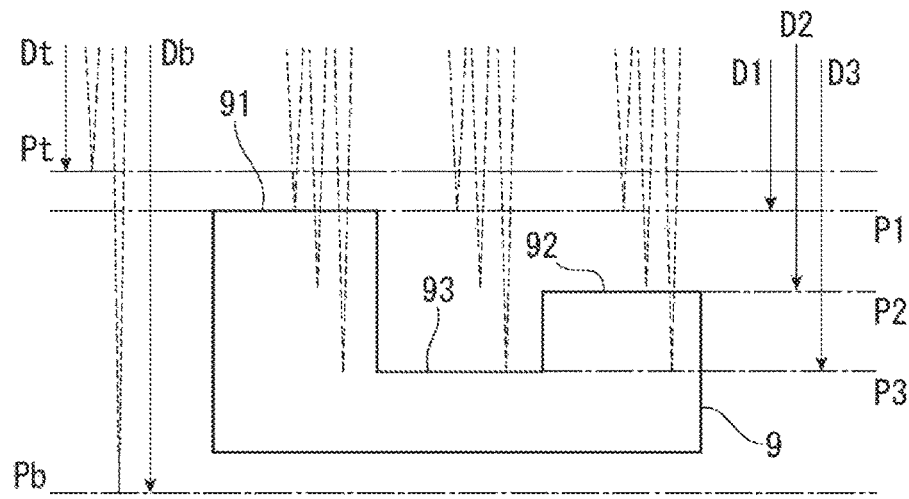

FIG. 20A schematically shows a focusing state in the combined mode.

Figure 20B:
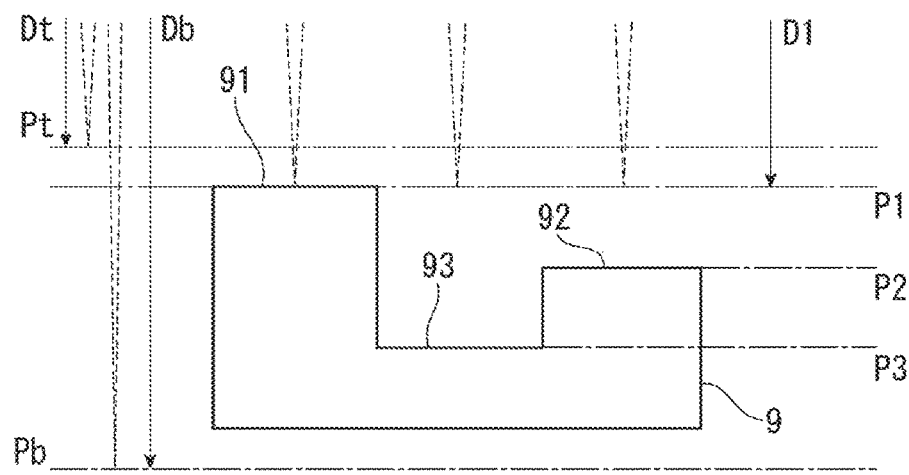

FIG. 20B schematically shows another focusing state in the combined mode.

Figure 20C:
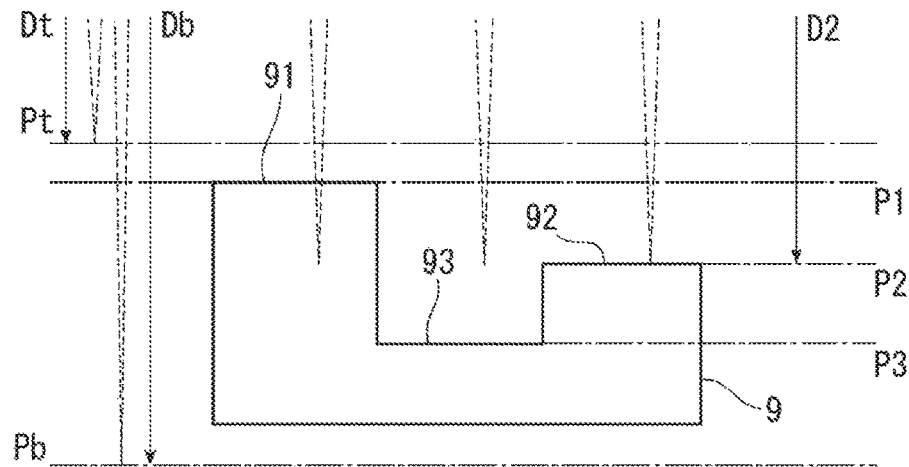

FIG. 20C schematically shows still another focusing state in the combined mode.

FIG. 21 schematically shows detected images in the combined mode.

FIG. 22 is a graph showing another combined mode in the exemplary embodiment.

Figure 23A:
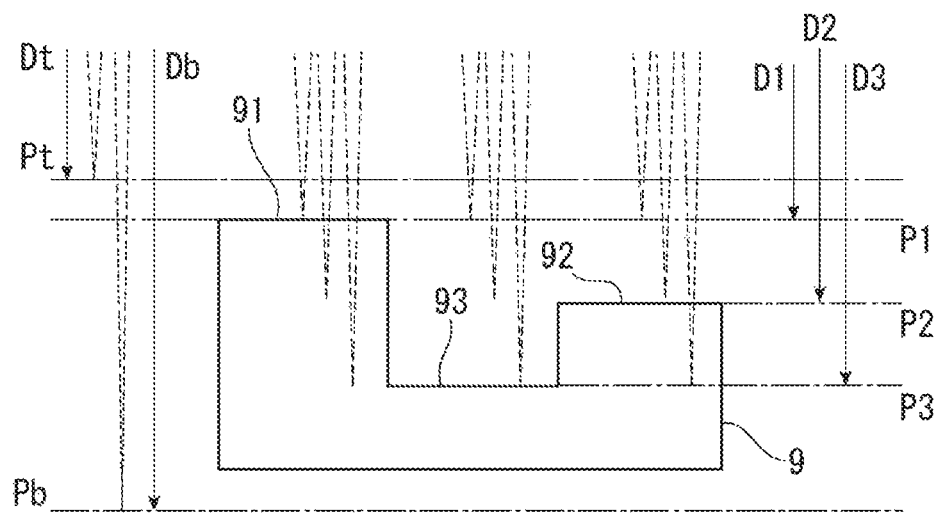

FIG. 23A schematically shows a focusing state in the another combined mode.

Figure 23B:
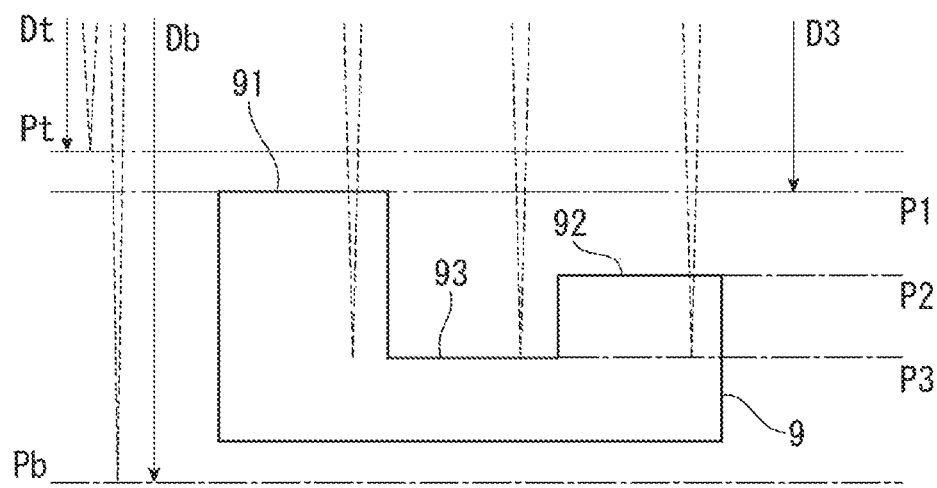

FIG. 23B schematically shows another focusing state in the another combined mode.

FIG. 24 schematically shows a detected image in the another combined mode.

DESCRIPTION OF EMBODIMENT(S)

An exemplary embodiment of the invention will be described below with reference to the attached drawings.
Variable Focal Length Lens Device 1

Figure 1:
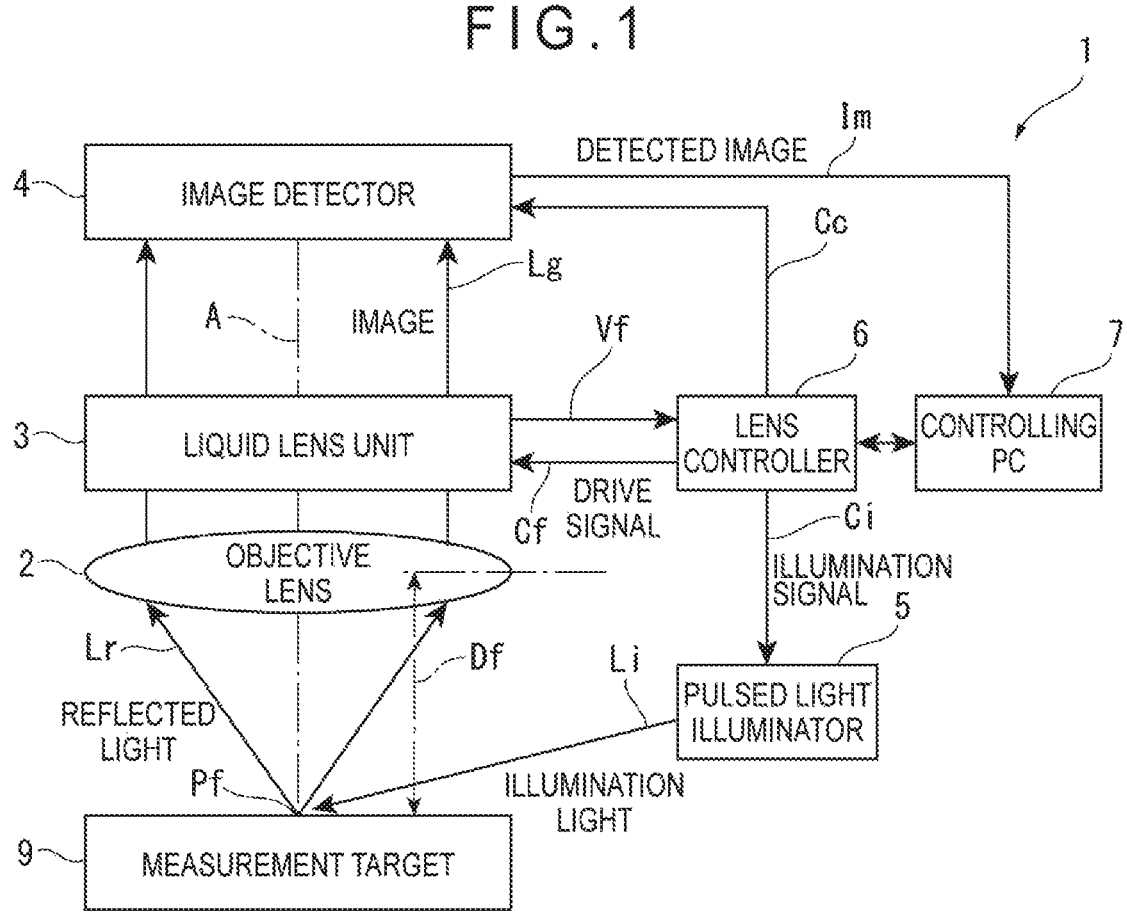

As shown in FIG. 1, a variable focal length lens device 1 is configured to detect an image of a surface of a measurement target 9 while varying a focal length.

Accordingly, the variable focal length lens device 1 includes: an objective lens 2 and a liquid lens unit 3 which are disposed on a common optical axis A intersecting with the surface of the measurement target 9; an image detector 4 configured to detect the image of the measurement target 9 through the objective lens 2 and the liquid lens unit 3; and a pulsed light illuminator 5 configured to apply a pulsed illumination to the surface of the measurement target 9.

The objective lens 2 and the liquid lens unit 3 form a variable focal length lens in the variable focal length lens device 1.

The variable focal length lens device 1 further includes: a lens controller 6 configured to control the liquid lens unit 3 and the pulsed light illuminator 5; and a controlling PC 7 configured to operate the lens controller 6.

An existing personal computer is used as the controlling PC 7. The desired function of the controlling PC 7 is achieved by running a predetermined control software on the controlling PC 7. The controlling PC 7 also has a function of capturing and processing an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controlling PC 7 in a form of a detected image Im of a predetermined format.

The pulsed light illuminator 5 includes a light-emitting element such as a light emitting diode (LED). The pulsed light illuminator 5 is configured to emit an illumination light Li only for a predetermined time to apply the pulsed illumination on the surface of the measurement target 9 when an illumination signal Ci is inputted from the lens controller 6. The illumination light Li is reflected at the surface of the measurement target 9. A reflected light Lr from the surface of the measurement target 9 forms the image Lg through the objective lens 2 and the liquid lens unit 3.

The liquid lens unit 3, in which a liquid lens system is formed, is configured to change a refractive index thereof in response to a drive signal Cf inputted from the lens controller 6. The drive signal Cf is a sinusoidal AC signal of a frequency capable of forming a standing wave in the liquid lens unit 3.

A focal length Df to a focus position Pf of the variable focal length lens device 1 can be changed as desired based on a focal length of the objective lens 2 by changing the refractive index of the liquid lens unit 3.

Liquid Lens Unit 3

Figure 2:
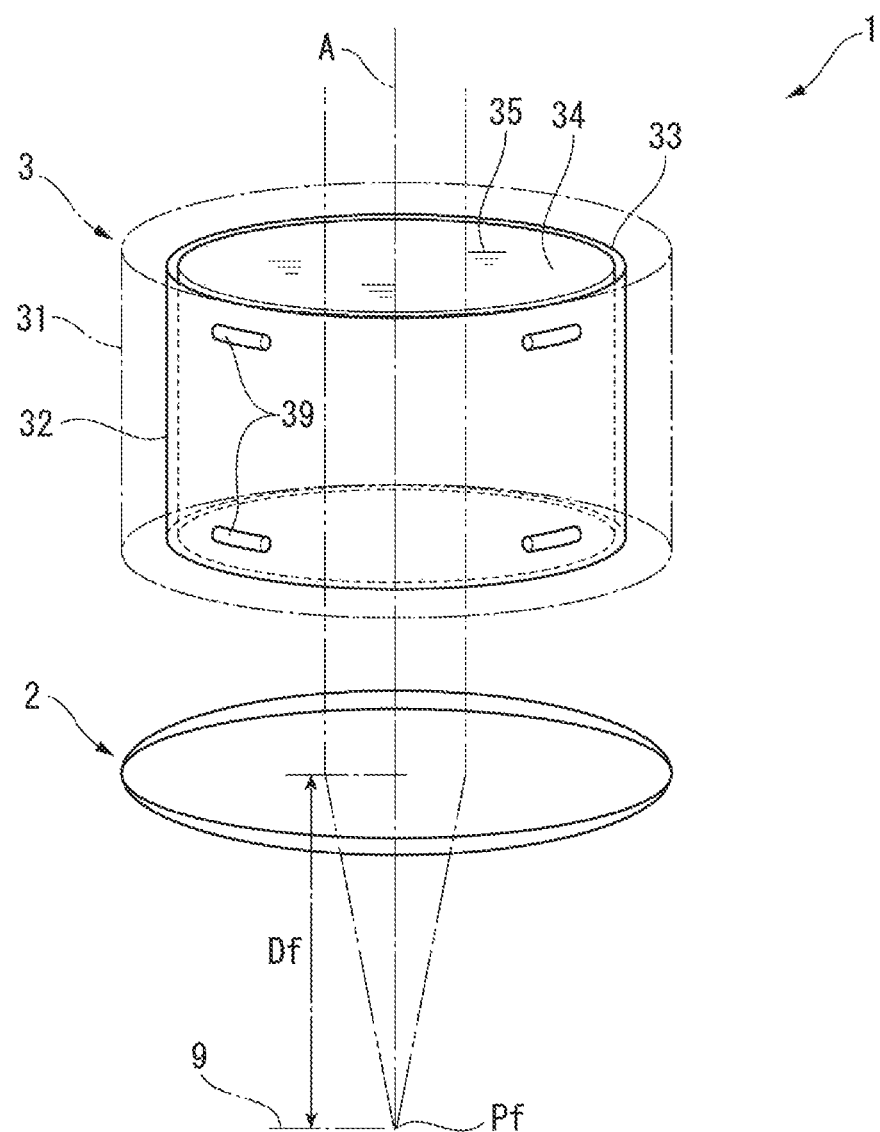

As shown in FIG. 2, the liquid lens unit 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

An interior of the case 31 is filled with a highly transparent liquid 35. The oscillator 32 is entirely immersed in the liquid 35 and an interior of the cylindrical oscillator 32 is filled with the liquid 35. The frequency of the AC voltage of the drive signal Cf is tuned to a frequency (e.g., 70 KHz) capable of forming a standing wave in the liquid 35 inside the oscillator 32.

Figure 3:
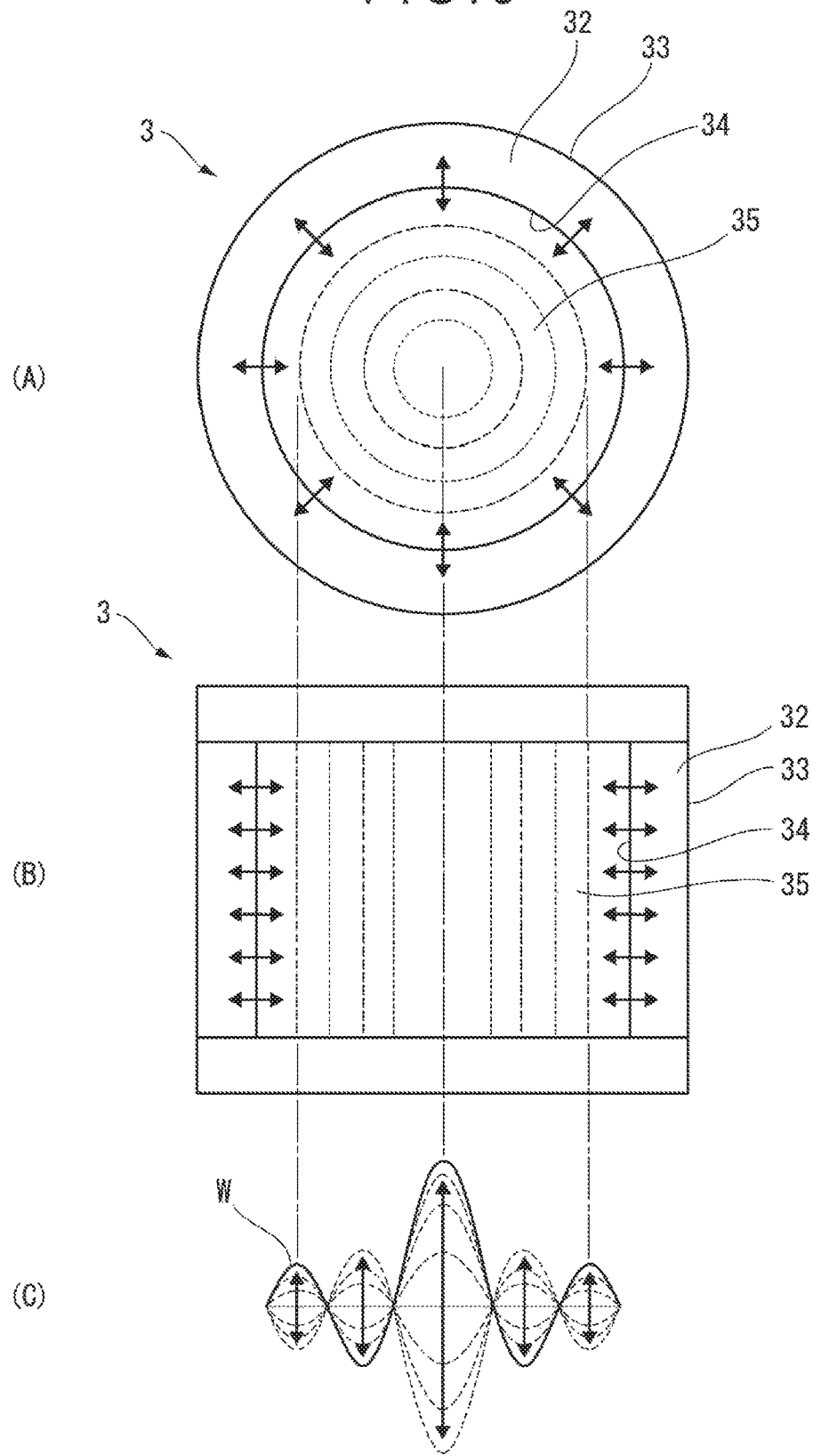

As shown in FIG. 3, when the oscillator 32 of the liquid lens unit 3 is oscillated, a standing wave is formed in the liquid 35 to create concentric regions with alternating refractive indexes (see FIGS. 3(A) and 3(B)).

A relationship between a distance (radius) from a central axis of the liquid lens unit 3 and the refractive index of the liquid 35 at this time is represented by a refractive index distribution W shown in FIG. 3(C).

Figure 4:
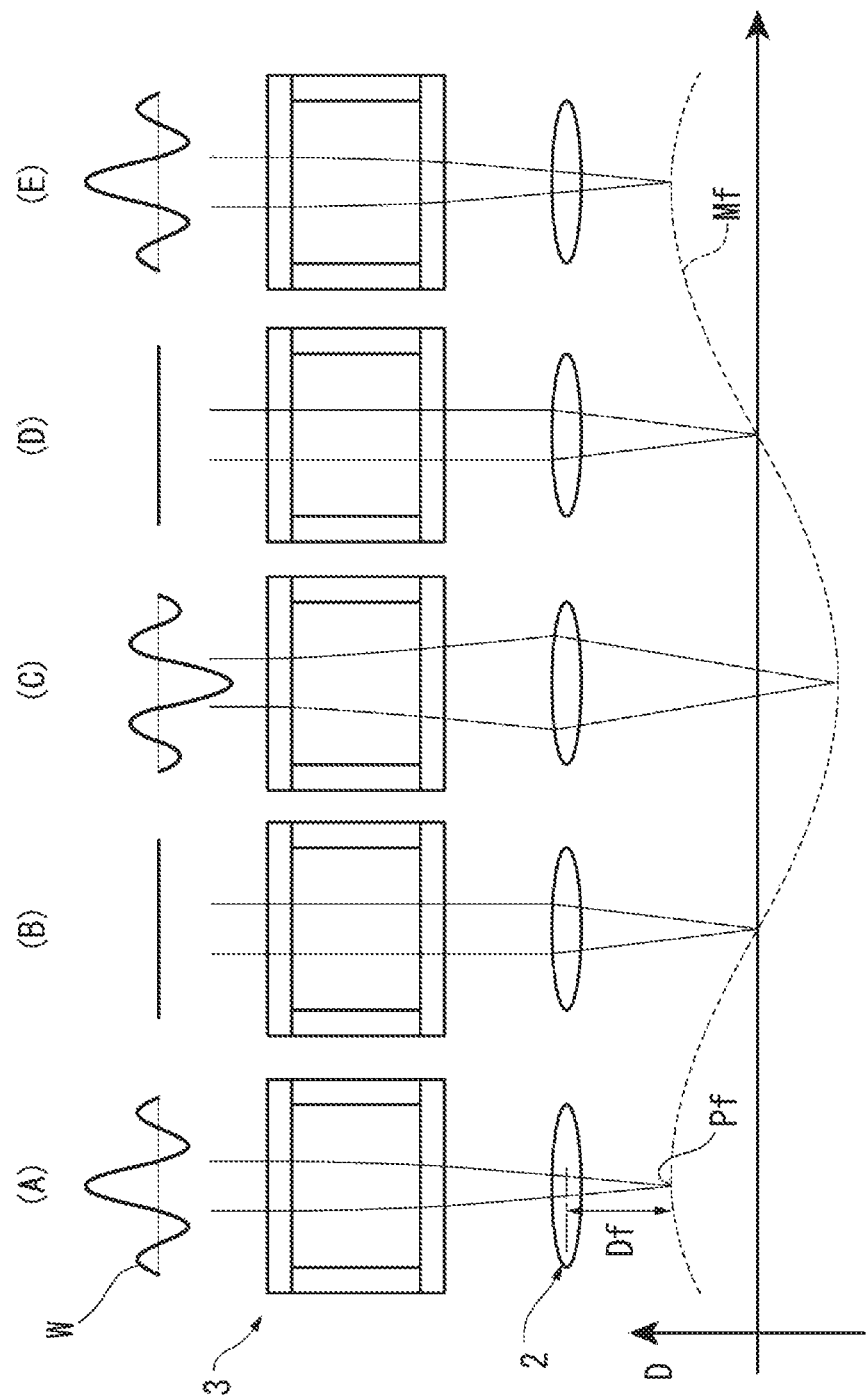

As shown in FIG. 4, since the drive signal Cf is a sinusoidal AC signal, a variation width of the refractive index distribution W of the liquid 35 in the liquid lens unit 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the liquid lens system 3 converges the light passing therethrough, the focus position Pf is located close to the lens system 3 and the focal length Df is shortest.

The refractive index distribution W is flat in the state shown in FIG. 4(B), where the liquid lens unit 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the liquid lens system 3 diffuses the light passing therethrough, the focus position Pf is located remote from the lens system 3 and the focal length Df is largest.

The refractive index distribution W is again flat in the state shown in FIG. 4(D), where the liquid lens unit 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focal-point-variation waveform Mf in FIG. 4.

By applying the pulsed illumination on the measurement target 9 at any of the focus positions Pf in the focal-point-variation waveform Mf and detecting an image illuminated at this time, the image of the illuminated target object at the focus position Pf at a desired focal length Df can be obtained.

Lens Controller 6

Figure 5:
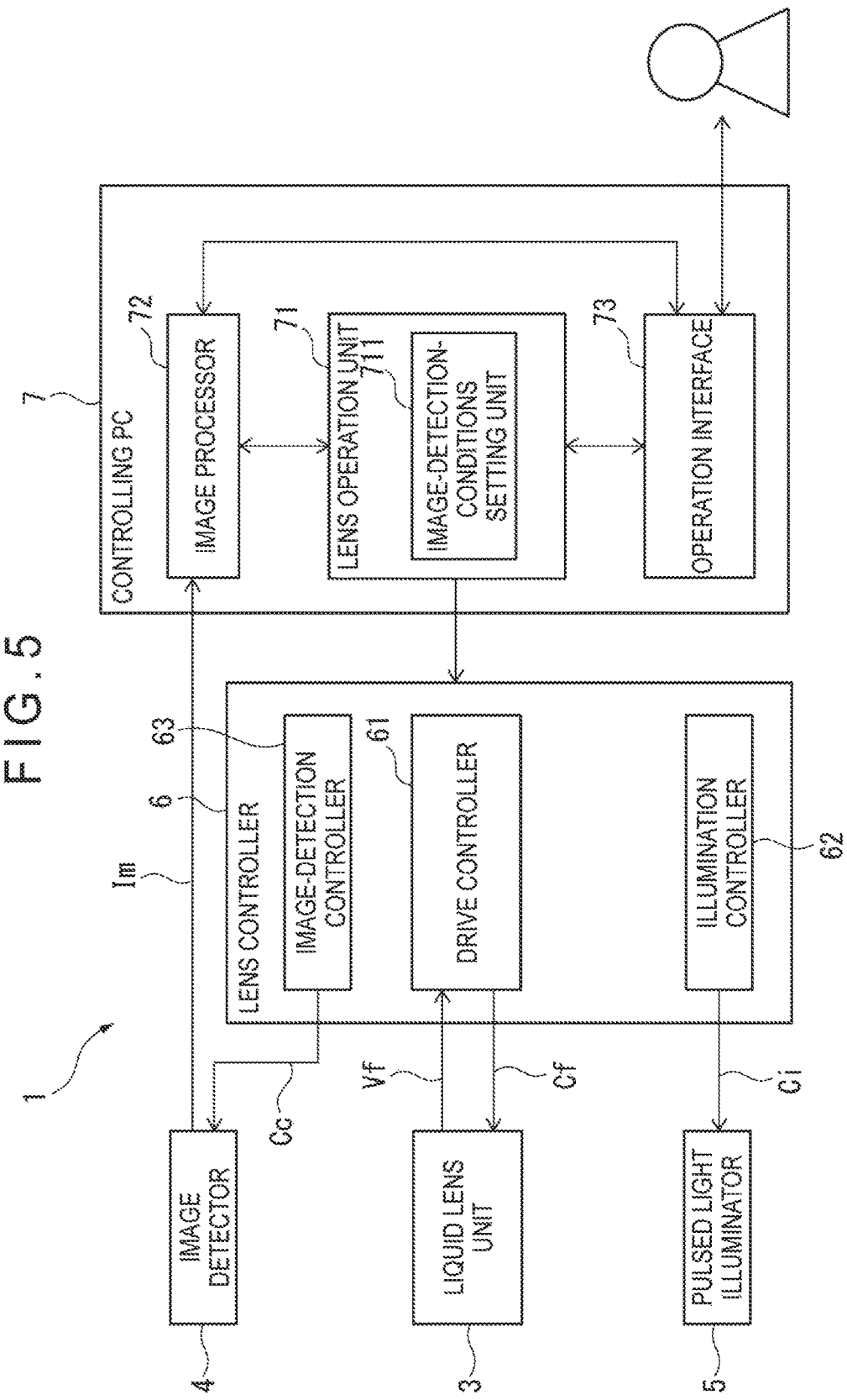
FIG. 5 is a block diagram showing a control configuration in the exemplary embodiment.

Referring back to FIG. 5, the oscillation of the liquid lens unit 3, the illumination of the pulsed light illuminator 5 and the image-detection of the image detector 4 of the variable focal length lens device 1 are controlled based on the drive signal Cf, the illumination signal Ci and an image-detection signal Cc from the lens controller 6. At this time, an effective power, a drive current or the like applied to the liquid lens unit 3 is returned as an oscillation state Vf to the lens controller 6.

The lens controller 6 includes: a drive controller 61 configured to output the drive signal Cf to the liquid lens unit 3; an illumination controller 62 configured to output the illumination signal Ci to the pulsed light illuminator 5; and an image-detection controller 63 configured to output the image-detection signal Cc to the image detector 4.

The controlling PC 7 is connected in order to, for instance, configure image-detection conditions such as the setting of the lens controller 6.

Controlling PC 7

The controlling PC 7 includes: a lens operation unit 71 configured to operate the lens controller 6 (e.g. to configure the setting of the image-detection conditions); an image processor 72 configured to capture and process the detected image Im from the image detector 4; and an operation interface 73 configured to receive a user's operation on the variable focal length lens device 1.

The lens operation unit 71 includes an image-detection-condition setting unit 711 according to the exemplary embodiment.

The image-detection-condition setting unit 711 is configured to receive an operation by the user through the operation interface 73 and select one of a plurality of image detection modes as image detection conditions. The plurality of image detection modes to be selectable are a single-plane mode, a multi-plane mode, a frame-by-frame mode and a combined mode.

The image detection modes are set at the lens controller 6, whereby the lens controller 6 controls the liquid lens unit 3, the image detector 4 and the pulsed light illuminator 5 to execute the following image-detecting operations (specifically described later).

In the single-plane mode, the lens controller 6 repeatedly executes an image detection loop including only a single-plane-image-detecting operation in which a single value of the focal length Df is specified.

In the multi-plane mode, the lens controller 6 repeatedly executes an image detection loop including only a multiplane-image-detecting operation in which a plurality of values of the focal length Df are specified.

In the frame-by-frame mode, the lens controller 6 repeatedly executes an image detection loop including a plurality of single-plane-image-detecting operations in which the values of the focal length Df are different from each other. In the frame-by-frame mode, the user can select the number of the single-plane-image-detecting operations (the number of the images to be detected in a single loop) and the focal length Df of the respective single-plane-image-detecting operations.

In the combined mode, the lens controller 6 repeatedly executes an image detection loop including at least one multi-plane-image-detecting operation and at least one single-plane-image-detecting operation.

In the multi-plane-image-detecting operation of the combined mode, a plurality values of the focal length Df for the image detection can be set in one cycle in which the focal length Df of the liquid lens unit 3 is varied (i.e., in one cycle of the sinusoidal focal-point-variation waveform Mf representing the drive signal Cf).

In the single-plane-image-detecting operation of the combined mode, a single value of the focal length Df for the image detection can be set in one cycle in which the focal length Df of the liquid lens unit 3 is varied. When the combined mode includes a plurality of single-plane-image-detecting operations, mutually different values of the focal length Df can be set.

The image-detection-condition setting unit 711 sets parameters (e.g., the number and the value of the focal length Df and the number of the single-plane-image-detecting operation) required in the selected image detection mode and sets the parameters as the image detection conditions in the lens controller 6.

The lens controller 6 in which the image detection conditions are set controls the liquid lens unit 3, the image detector 4 and the pulsed light illuminator 5, whereby the image detection loop by the specified image detection mode is repeated to enable the variable focal length lens device 1 to execute a desired image detection.

Setting of Image Detection Conditions

Figure 6:
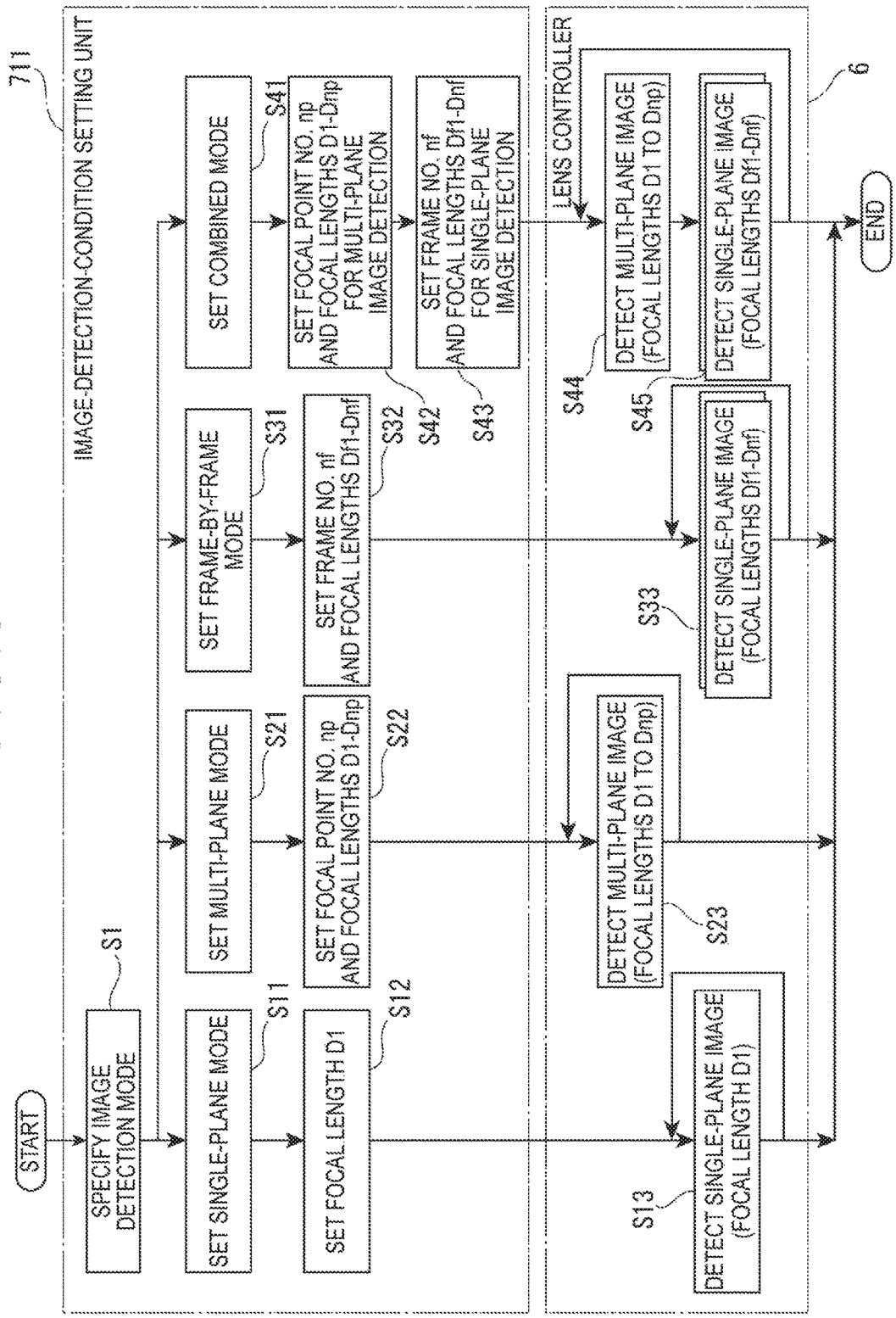
FIG. 6 is a flowchart showing an image-detecting operation in the exemplary embodiment.

FIG. 6 shows the setting operation of the image-detection-condition setting unit 711 and the controlling operation of the lens controller 6 on a basis of the setting.

Initially, the image-detection-condition setting unit 711 receives a specified image detection mode (Step S1). The image detection mode is specified by the user's operation on the operation interface 73 (see FIG. 5).

Based on the user's operation, the image-detection-condition setting unit 711 sets, as the image detection mode, one of the single-plane mode (Step S11), the multi-plane mode (Step S21), the frame-by-frame mode (Step S31), and the combined mode (Step S41).

After setting the image detection mode, the image-detection-condition setting unit 711 sets the parameters required for the set image detection mode. The parameters are also set by the user's operation on the operation interface 73 (see FIG. 5).

When the single-plane mode has been set (Step S11), since the image detection loop to be repeatedly executed during the image-detecting operation only includes the single-plane-image-detecting operation, the image-detection-condition setting unit 711 sets only the focal length Df at a single value (a value D1 of the focal length) for the single-plane-image-detecting operation (Step S12).

When the multi-plane mode has been set (Step S21), since the image detection loop to be repeatedly executed during the image-detecting operation only includes the multi-plane-image-detecting operation, the image-detection-condition setting unit 711 sets the number of the focusing surfaces (i.e., the number of the focal points np) and the focal length Df (the values D1 to Dnp of the focal length) of each of the focusing surfaces in the multi-plane-image-detecting operation (Step S22).

When the frame-by-frame mode has been set (Step S31), since the image detection loop to be repeatedly executed during the image-detecting operation includes the plurality of single-plane-image-detecting operations, the image-detection-condition setting unit 711 sets the number of screens (frames) (the number nf of the frames) to be detected by the single-plane-image-detecting operations and the focal length Df (the values Df1 to Dnf of the focal length) of each of the screens (Step S32).

When the combined mode has been set (Step S41), the image detection loop to be repeatedly executed during the image-detecting operation includes at least one multi-plane-image-detecting operation and at least one single-plane-image-detecting operation. Accordingly, as the parameters for the multi-plane-image-detecting operation, the image-detection-condition setting unit 711 sets the number of the focusing surfaces (i.e., the focal point np) and the focal length Df (the values D1 to Dnp of the focal length) of each of the focusing surfaces (Step S42). In addition, as the parameters for the single-plane-image-detecting operation, the image-detection-condition setting unit 711 sets the number of screens (frames) (the number of the frames nf) and the focal length Df (the values Df1 to Dnf of the focal length) of each of the screens (Step S43).

Steps S42 and S43 may be conducted in reverse order or at the same time.

In the combined mode, the focal point np in the multi-plane-image-detecting operation and the number of the frame nf in the single-plane-image-detecting operation can be selected as needed. The plurality values D1 to Dnp of the focal length in the multi-plane-image-detecting operation may be the same as or different from the values Df1 to Dnf of the focal length in the single-plane-image-detecting operation. In most cases, images are roughly detected at the plurality values D1 to Dnp of the focal length in the multi-plane-image-detecting operation, some of the values D1 to Dnp of the focal length are set as the values Df1 to Dnf of the focal length, and the images are detected in detail at the values Df1 to Dnf of the focal length by the single-plane-image-detecting operation.

After setting the parameters for each of the image detection modes, the image-detection-condition setting unit 711 transmits the set image detection mode and its parameters to the lens controller 6. After receiving the image detection mode and its parameters, the lens controller 6 controls the liquid lens unit 3, the image detector 4 and the pulsed light illuminator 5 on a basis of the contents of the parameters to execute the image-detecting operation specified by the user.

When the single-plane mode has been set (Step S11), the lens controller 6 repeatedly executes the image detection loop including only the single-plane-image-detecting operation at the value D1 of the focal length (Step S13).

When the multi-plane mode has been set (Step S21), the lens controller 6 repeatedly executes the image detection loop including only the multi-plane-image-detecting operation at the values D1 to Dnp of the focal length (Step S23).

When the frame-by-frame mode has been set (Step S31), the lens controller 6 repeatedly executes the image detection loop continuously operating the single-plane-image-detecting operation by the number of the frames nf (sequentially at the values Df1 to Dnf of the focal length) (Step S33).

When the combined mode has been set (Step S41), the lens controller 6 repeatedly executes the image detection loop continuously operating the multi-plane-image-detecting operation at the values D1 to Dnp of the focal length (Step S44) and the single-plane-image-detecting operation at the number nf of the frames (sequentially at the values Df1 to Dnf of the focal length) (Step S45).

Next, specific operations of the single-plane mode, the multi-plane mode, the frame-by-frame mode and the combined mode will be described.

Single-Plane Mode

Figure 7:
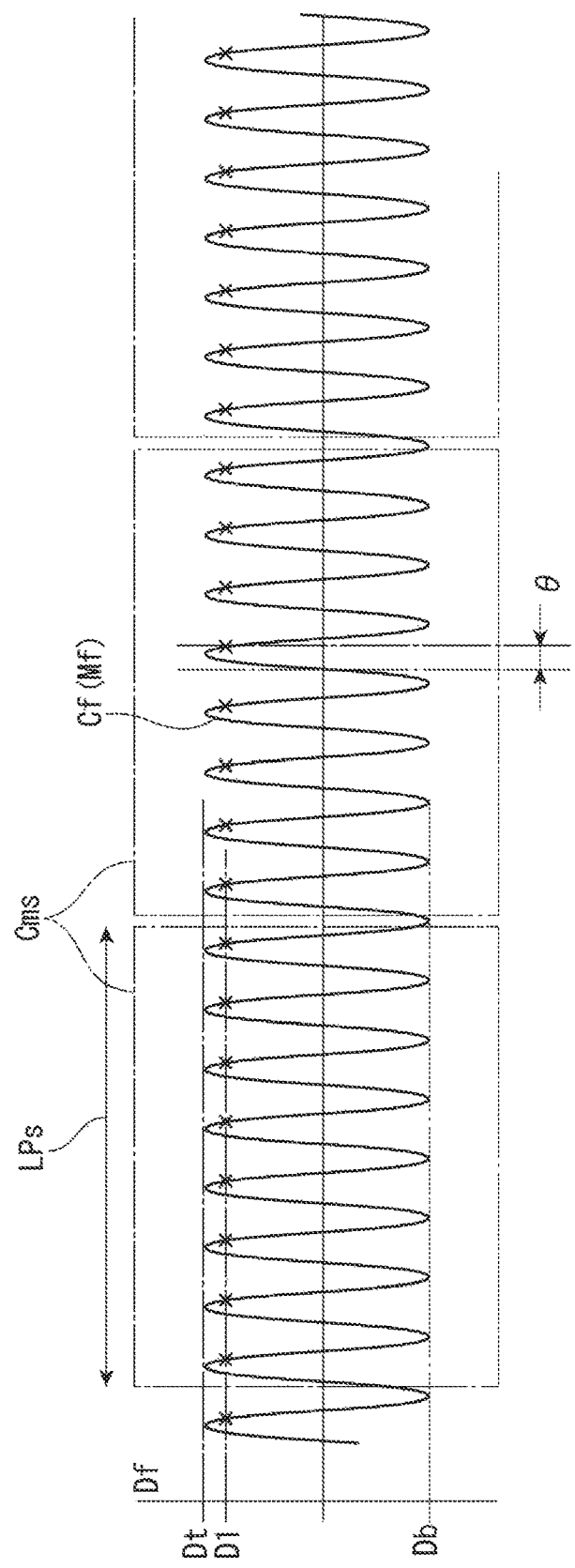
FIG. 7 is a graph showing a single-plane mode in the exemplary embodiment.

FIGS. 7 to 9 show operations in the single-plane mode in the exemplary embodiment.

In the single-plane mode As shown in FIG. 7, the lens controller 6 repeatedly executes an image detection loop LPs including only a single-plane-image-detecting operation Cms.

Herein, the drive signal Cf is in a form of the sinusoidal focal-point-variation waveform Mf (see FIG. 4) given from the lens controller 6 in order to drive the liquid lens unit 3 (see FIG. 1). When the drive signal Cf is at the maximum value, the focal length Df between the liquid lens unit 3 and the objective lens 2 (see FIG. 1) is the nearest focal length Dt. When the drive signal Cf is at the minimum value, the focal length Df is the farthest focal length Db.

In the image detection loop LPs in the single-plane mode, the lens controller 6 transmits an illumination signal Ci to the pulsed light illuminator 5 (see FIG. 1) at a phase θ1 corresponding to the specified focal length D1 in one cycle of the drive signal Cf, whereby the image detector 4 (see FIG. 1) acquires a single-plane detected image Ims in focus at the focal length D1 (see FIG. 9).

The measurement target 9 has different-height portions 91, 92, 93 on a surface as shown in FIG. 8. The portions 91, 92, 93 are disposed between the minimum value Dt and the maximum Db of the focal length described above (between the focusing surfaces Pt, Pb of the respective values Dt and Db of the focal length). Accordingly, the objective lens 2 and the liquid lens unit 3 can focus the pulsed illumination on the focusing surfaces P1, P2, P3 respectively in conformity with the portions 91, 92, 93.

When the single-plane-image-detecting operation Cms is set at the focal length D1 and the focal length D1 corresponds to the focusing surface P1, an image of the portion 91 in conformity with the focusing surface P1 is detected in focus. However, the portions 92, 93 (in conformity with the focusing surfaces P2, P3) are out of the focusing surface P1, so that images of the portions 92, 93 are detected out of focus.

In FIG. 9, since an area I91 corresponding to the portion 91 in the single-plane detected image Ims is detected in focus, the detected image is bright and clear. In contrast, since areas I92, I93 corresponding to the respective portions 92, 93 are detected out of focus, the detected images are dark and unclear depending on a distance from the focusing surface P1.

Accordingly, when the clear image of the area I91 is sufficient as the detected image and clearness is not required in the images of the areas I92, I93, the single-plane mode is usable.

Multi-Plane Mode 1

FIGS. 10 to 12 show operations in the multi-plane mode in the exemplary embodiment.

In the multi-plane mode as shown in FIG. 10, the lens controller 6 repeatedly executes an image detection loop LPm including only a multi-plane-image-detecting operation Cmm.

Herein, the drive signal Cf, the focal length Dt, Db, and the focusing surfaces Pt, Pb in FIGS. 10 and 11 are the same as those described in relation to FIGS. 7 and 8.

In the image detection loop LPm of the multi-plane mode, provided that the number of the focal point is equal to two (np=2), two values D1, D2 of the focal length are specified in one cycle of the drive signal Cf, and the lens controller 6 transmits the illumination signal Ci at the phases θ1, θ2 corresponding to the values D1, D2 of the focal length, whereby a multi-plane detected image Imm in focus at the values D1, D2 of the focal length is acquired (see FIG. 12).

When the multi-plane-image-detecting operation Cmm is set at the values D1, D2 of the focal length (focusing surfaces P1, P2) as shown in FIG. 11, the images of the portions 91, 92 in conformity with the focusing surfaces P1, P2 are detected in focus. When the image of the portion 91 (focusing surface P1) is in focus, the image of the portion 92 (focusing surface P2) is detected out of focus. When the image of the portion 92 (focusing surface P2) is in focus, the image of the portion 91 (focusing surface P1) is detected out of focus.

In FIG. 12, the area I91 corresponding to the portion 91 in the multi-plane detected image Imm is brought into focus at the focal length D1, thereby being detected as a bright and clear image. The area I92 corresponding to the portion 92 is brought into focus at the focal length D2, thereby being detected as a bright and clear image. In other words, images of the two areas I91, I92 can be detected as clear images However, since the image of the area I91 is detected as a dark, unclear and out-of-focus image at the focal length D2 and is superimposed on the clear image at the focal length D1, the image of the area I91 becomes slightly dark and unclear image image (compared with the area I91 in the single-plane detected image Ims). The same is applied to the area I92.

On the other hands, the area I93 corresponding to the portion 93 becomes out of focus at both of the values D1, D2 of the focal length, thereby being detected as a dark and unclear image as compared with the images at the areas I91, I92.

Accordingly, in the multi-plane mode, the images of the areas I91, I92 at the values D1, D2 of the focal length can be simultaneously obtained as relatively clear images.

However, even though the images of the areas I91, I92 are relatively clear, clearness of the images of the areas I91, I92 is inferior to that in the single-plane mode, so that the image detection in another single-plane mode is required in order to obtain a clear image.

Multi-Plane Mode 2

FIGS. 13 to 15 show operations at a different setting in the multi-plane mode.

In the multi-plane mode described in FIGS. 10 to 12, the focal point is defined as two (np=2), the images are detected at the values D1, D2 of the focal length (focusing surfaces P1, P2) in the multi-plane-image-detecting operation Cmm, so that the images of the focusing surfaces P1, P2 in conformity with the respective portions 91, 92 are detected in focus.

In contrast, in the multi-plane mode described in FIGS. 13 to 15, the focal point is defined as three (np=3), the images are detected at the values D1, D2, D3 of the focal length (focusing surfaces P1, P2, P3) in the multi-plane-image-detecting operation Cmm, so that the images of the focusing surfaces P1, P2, P3 in conformity with the respective portions 91, 92, 93 are detected in focus.

In the multi-plane detected image Imm shown in FIG. 15, each of the areas I91, I92, I93 corresponding to the respective portions 91,92,93 is brought into focus at the corresponding one of the values D1, D2, D3 of the focal length, thereby being detected as a bright and clear image. However, each of the areas I91, I92, I93 is detected as a dark and unclear image when the other two areas are in focus respectively at two values of the focal length. The dark and unclear images are superimposed on the bright and clear images, resulting in considerably dark and unclear images (as compared with images of the areas I91, I92 in FIG. 12).

Accordingly, although relatively clear images of the areas at the plurality of values of the focal length can be simultaneously obtained in the multi-plane mode, it should be noted that clearness of the images are impaired as the number of the focal point is increased Frame-by-Frame Mode FIGS. 16 to 18 show operations in the frame-by-frame mode in the exemplary embodiment.

In the frame-by-frame mode, the lens controller 6 repeatedly executes an image detection loop LPf including a plurality (i.e., the number nf of the frames) of single-plane-image-detecting operation Cms (the values Df1 to Dnf of the focal length).

Herein, the drive signal Cf, the focal length Dt, Db, and the focusing surfaces Pt, Pb in FIGS. 16, 17A and 17B are the same as those described in relation to FIGS. 7 and 8.

The single-plane-image-detecting operation Cms in the frame-by-frame mode is the same as that in the above-described single-plane mode.

As shown in FIG. 16, the image detection loop LPf is rendered to have the number of the frame nf=3 and is formed by coupling three single-plane-image-detecting operations Cms (image-detecting operation Cm1, Cm2, Cm3). At the image-detecting operations Cm1, Cm2, Cm3, the focal length is switched to the corresponding one of the values D1, D2, D3 of the focal length.

In part (A) of FIG. 16, the focal length D1 is set for the image-detecting operation Cm1, where the image detection is performed at the phase θ1 in one cycle of the drive signal Cf.

In the image-detecting operation Cm1 shown in FIG. 17A, the pulsed illumination is brought into focus on the focusing surface P1 corresponding to the focal length D1, so that the portion 91 of the measurement target 9 is detected as an in-focus image.

As shown in part (A) of FIG. 18, since the area I91 corresponding to the portion 91 in a detected image Im1 by the image-detecting operation Cm1 is detected in focus, the detected image is bright and clear. In contrast, since the areas I92, I93 corresponding to the portions 92, 93 are detected out of focus, the detected images are dark and unclear depending on a distance from the focusing surface P1.

Likewise, in part (B) of FIG. 16, the focal length D2 is set for the image-detecting operation Cm2, where the single-plane-image-detecting operation Cms is performed at the phase θ2.

In the image-detecting operation Cm2 shown in FIG. 17B, the pulsed illumination is brought into focus on the focusing surface P2 corresponding to the focal length D2, so that the portion 92 of the measurement target 9 is detected as an in-focus image.

Consequently, as shown in part (B) of FIG. 18, the area I92 corresponding to the portion 92 in a detected image Im2 by the image-detecting operation Cm2 is detected in focus, while the areas I91, I93 corresponding to the portions 91, 93 are detected as dark and unclear images.

Further, in part (C) of FIG. 16, the focal length D3 is set for the image-detecting operation Cm3, where the single-plane-image-detecting operation Cms is performed at the phase θ3.

In the image-detecting operation Cm3 shown in FIG. 17C, the pulsed illumination is brought into focus on the focusing surface P3 corresponding to the focal length D3, so that the portion 93 of the measurement target 9 is detected as an in-focus image.

Consequently, in a detected image Im3 by the image-detecting operation Cm3 as shown in part (C) of FIG. 18, the area I93 corresponding to the portion 93 is detected as a bright and clear image, while the areas I91, I92 corresponding to the portions 91, 92 are detected as dark and unclear images.

In the image detection loop LPf as shown in FIG. 16, after the image-detecting operations Cm1 to Cm3 are executed, the image-detecting operation is returned to the image-detecting operation Cm1 to repeat the image-detecting operations Cm1 to Cm3.

As a result, the detected images Im1 to Im3 shown in FIG. 18 are sequentially and repeatedly obtained in the frame-by-frame mode.

Accordingly, in the image-detecting operations Cm1 to Cm3 of the frame-by-frame mode, clear detected images Ims equivalent to those in the single-plane-image-detecting operation Cms can be obtained. In particular, although deterioration in the quality of the detected images at the plurality of the values of the focal length in the multi-plane mode is unavoidable, such deterioration of the images is avoidable in the frame-by-frame mode.

However, it should be noted that the time required for a series of steps is increased since the image detection loop LPf includes the image-detecting operations Cm1 to Cm3.

Combined Mode 1

FIGS. 19 to 21 show operations in the combined mode in the exemplary embodiment.

In the combined mode, the lens controller 6 repeatedly executes an image detection loop LPc including at least one multi-plane-image-detecting operation Cmm and at least one single-plane-image-detecting operation Cms.

Herein, the drive signal Cf, the focal length Dt, Db, and the focusing surfaces Pt, Pb in FIGS. 19, 20A, 20B and 20C are the same as those described in relation to FIGS. 7 and 8.

The exemplary image detection loop LPc in the combined mode shown in FIGS. 19 to 21 includes one multi-plane-image-detecting operation Cmm and two single-plane-image-detecting operations Cms.

The single-plane-image-detecting operations Cms and the multi-plane-image-detecting operation Cmm forming the image detection loop LPc are the same as those described in the single-plane mode and the multi-plane mode.

As shown in FIG. 19, the image detection loop LPc includes one multi-plane-image-detecting operation Cmm (image-detecting operation Cm1) and two single-plane-image-detecting operations Cms (image-detecting operations Cm2, Cm3).

In the multi-plane-image-detecting operation Cmm of the image-detecting operation Cm1, the focal points are set at np=3 to define the values D1, D2, D3 of the focal length.

The single-plane-image-detecting operation Cms subsequent to the multi-plane-image-detecting operation Cmm of the image-detecting operation Cm1 is specified to have the number of the frame nf=2, and the two image-detecting operations Cm2, Cm3 are set based on this specified number of the frame. The focal length D1 is set for the image-detecting operation Cm2. The focal length D2 is set for the image-detecting operation Cm3.

In part (A) of FIG. 19, the multi-plane-image-detecting operation Cmm at the values D1, D2, D3 of the focal length is executed in the image-detecting operation Cm1, where the image detection is performed at the phases θ1, θ2, θ3 in one cycle of the drive signal Cf.

In the multi-plane-image-detecting operation Cmm of the image-detecting operation Cm1 shown in FIG. 20A, the pulsed illumination is brought into focus on the focusing surfaces P1, P2, P3 corresponding to the values D1, D2, D3 of the focal length, so that the portions 91, 92, 93 of the measurement target 9 are detected in focus images.

The detected image Im1 by the image-detecting operation Cm1 shown in part (A) of FIG. 21 is obtained as the multi-plane detected image Imm by the multi-plane-image-detecting operation Cmm, in which each of the areas I91, I92, I93 corresponding to the respective portions 91,92,93 is brought into focus at the corresponding one of the values D1, D2, D3 of the focal length, thereby being detected as a bright and clear image.

However, each of the areas I91, I92, I93 in the detected image Im1 is detected as a dark and unclear image when the other two areas are in focus at the respective values of the focal length. The dark and unclear images are superimposed on the bright and clear images, resulting in considerably dark and unclear images.

Since the focusing surface P2 of the area I92 is close to the other focusing surfaces P1, P3, the images of the areas I91, I93 are relatively not dark even when the focusing surface P2 is in focus. Accordingly, the resultant superimposed image of the area I92 can be detected as a brighter image than those of the areas I91, I93.

In contrast, since the areas I91, I93 are mutually remote, the images of the areas I91, I93, which are superimposed to the in-focus images of the respective areas I91, I93, are darker than the image of the area I92, so that the superimposed images of the areas I91, I93 are detected darker than that of the image of the area I92.

For this reason, in the detected image Im1, a boundary I94 between the dark areas I91, I93 is unclear, so that the boundary I94 is likely to be more difficult to distinguish than a boundary I95 between the relatively bright area I92 and the dark area I93.

In part (A) of FIG. 19, the single-plane-image-detecting operation Cms at the focal length D1 is executed in the image-detecting operation Cm2, where the image detection is performed at the phase θ1 in one cycle of the drive signal Cf.

In the single-plane-image-detecting operation Cms of the image-detecting operation Cm2 shown in FIG. 20B, the pulsed illumination is brought into focus on the focusing surface P1 corresponding to the focal length D1, so that the portion 91 of the measurement target 9 is detected as an in-focus image.

As shown in part (B) of FIG. 21, since the detected image Im2 by the image-detecting operation Cm2 is obtained as the single-plane detected image Ims by the single-plane-image-detecting operation Cms and the area I91 corresponding to the portion 91 is detected in focus, the detected image of the area I91 is bright and clear. In contrast, since the areas I92, I93 corresponding to the respective portions 92, 93 are detected out of focus, the detected images are dark and unclear depending on a distance from the focusing surface P1.

Although the boundary I95 between the dark areas I92, I93 is unclear in the detected image Im2, the boundary I94 between the bright area I91 and the dark area I93 can be detected as a clear image.

Likewise, in the image-detecting operation Cm3 shown in part (C) of FIG. 19, the single-plane-image-detecting operation Cms at the focal length D2 is executed at the phase θ2 in one cycle of the drive signal Cf.

In the image-detecting operation Cm3 shown in FIG. 20C, the pulsed illumination is brought into focus on the focusing surface P2 corresponding to the focal length D2, so that the portion 92 of the measurement target 9 is detected as an in-focus image.

Consequently, in the detected image Im3 by the image-detecting operation Cm3 as shown in part (C) of FIG. 21, the area I92 corresponding to the portion 92 is detected as a bright and clear image, while the areas I91, I93 corresponding to the portions 91, 93 are detected as dark and unclear images.

In the image detection loop LPf as shown in FIG. 19, after the image-detecting operation Cm1 (the multi-plane-image-detecting operation Cmm) and the image-detecting operations Cm2, Cm3 (two single-plane-image-detecting operations Cms) are executed, the image-detecting operation is returned to the image-detecting operation Cm1 to repeat the image-detecting operations Cm1, Cm2, Cm3.

As a result, the detected images Im1 to Im3 shown in FIG. 21 are sequentially and repeatedly obtained in the combined mode.

Accordingly, in the combined mode, the multi-plane detected image Imm in focus at the three values D1, D2, D3 of the focal length by the image-detecting operation Cm1 are obtained and the single-plane detected images Ims in focus at the values D1, D2 of the focal length are obtained by the image-detecting operations Cm2, Cm3.

Among the image-detecting operations, the image-detecting operation Cm1 provides the multi-plane detected image Imm in focus at the three values D1, D2, D3 of the focal length, although deterioration in quality of the multi-plane detected image Imm is unavoidable since the multi-plane detected image Imm includes the in-focus images and the out-of-focus images superimposed on each other.

In contrast, although each of the image-detecting operations Cm2, Cm3 provides an image in focus only on a single focusing surface, the image in focus on the area I91 or I92 on the corresponding focusing surface can be bright and clear.

When the combined mode is used, the combined mode is set so that the multi-plane detected image Imm covers an area and a boundary not requiring a high-resolution and the single-plane detected image Ims covers an area and a boundary requiring a high resolution, whereby an efficient image detection with a high resolution can be performed.

Specifically, in the frame-by-frame mode shown in FIG. 16, the image detection with a high resolution is performed at all the values D1, D2, D3 of the focal length by performing three single-plane-image-detecting operations Cms at the three values D1, D2, D3 of the focal length.

If an image detection is performed at five values of the focal length in the frame-by-frame mode, five single-plane-image-detecting operations Cms need to be set in the image detection loop LPf, whereby the image detection of five frames is performed to prolong a loop processing time. However, if a high resolution is required at only two of the five values of the focal length and the image-detecting operation in the multi-plane mode is sufficient in resolution at the other three values of the focal length, a use of the combined mode can shorten the processing time.

In other words, a use of the image detection loop LPc for detecting a single multi-plane detected image Imm in which five values of the focal length are set and two single-plane detected images Ims requiring a high resolution in which two values of the focal length are set can reliably provide a necessary detected image by the image-detecting operations Cm1 to Cm3 for three frames in total, Thus, a use of the combined mode can shorten the processing time while reliably obtaining a high-resolution image of a necessary part.

Combined Mode 2

FIGS. 22 to 24 show operations at a different setting in the combined mode.

In the combined mode as shown in FIGS. 19 to 21, a single multi-plane-image-detecting operation Cmm (the image-detecting operation Cm1, the focal point np=3) and two single-plane-image-detecting operations Cms (the image-detecting operations Cm2, Cm3, the number of the frame nf=2) form the image detection loop LPc.

In contrast, in the combined mode as shown in FIGS. 22 to 24, a single multi-plane-image-detecting operation Cmm (the image-detecting operation Cm1, the focal points np=3) and only one single-plane-image-detecting operation Cms (the image-detecting operation Cm2, the number of the frame nf=1) form the image detection loop LPc. The number of the frame nf=1 as described above corresponds to the minimum number of the frame in the combined mode.

In the multi-plane-image-detecting operation Cmm at the image-detecting operation Cm1 shown in part (A) of FIG. 22, the focal point np=3 and the values D1, D2, D3 of the focal length are set. This is the same as the image-detecting operation Cm1 described above in the part (A) of FIG. 19. A relationship between the focusing surface and the focal length shown in FIG. 23A is the same as that in FIG. 20A. The detected image Im1 shown in part (A) of FIG. 24 is the same as that in the part (A) of FIG. 21.

Specifically, the detected image Im1 by the image-detecting operation Cm1 is obtained as the multi-plane detected image Imm by the multi-plane-image-detecting operation Cmm, in which each of the areas I91, I92, I93 corresponding to the respective portions 91, 92, 93 is brought into focus at the corresponding one of the values D1, D2, D3 of the focal length, thereby being detected as a bright and clear image.

In part (B) of FIG. 22, the single-plane-image-detecting operation Cms is performed at a value D3 of the focal length in the image-detecting operation Cm2, where the image is detected at the phase θ3 in one cycle of the drive signal Cf.

In the single-plane-image-detecting operation Cms of the image-detecting operation Cm2 shown in FIG. 23B, the pulsed light is brought into focus on the focusing surface P3 corresponding to the value D3 of the focal length, so that the portion 93 of the measurement target 9 is detected as an in-focus image.

As shown in part (B) of FIG. 24, since the detected image Im2 by the image-detecting operation Cm2 is obtained as the single-plane detected image Ims by the single-plane-image-detecting operation Cms and the area I93 corresponding to the portion 93 is detected in focus, the detected image of the area I93 is bright and clear. In contrast, since the areas I91, I93 corresponding to the respective portions 91, 92 are detected out of focus, the detected images are dark and unclear depending on a distance from the focusing surface P3.

In the detected image Im2, the boundary I94 is defined between the dark area I91 and the bright area I93 and the boundary I95 is defined between the dark area I92 and the bright area I93. Accordingly, both of the boundary I94 and the boundary I95 are detected as clear images.

Thus, a use of the combined mode and an appropriate setting of the focal length at which the single-plane-image-detecting operation Cms is performed can shorten the processing time while reliably obtaining a high-resolution image of a necessary part.

Advantage(s) of Exemplary Embodiment(s)

According to the above-described exemplary embodiment, advantages as follows are obtainable.

In the exemplary embodiment, the lens controller 6 controls the variable focal length lens (the liquid lens unit 3 and the objective lens 2) based on the image detection conditions set by the image-detection-condition setting unit 711 to perform the image detection with the image detector 4.

At this time, when the combined mode is set as the image detection conditions, the image detector 4 repeatedly executes the image detection loop LPc including at least one multi-plane-image-detecting operation Cmm and at least one single-plane-image-detecting operation Cms.

As a result, the multi-plane detected image Imm by the multi-plane-image-detecting operation Cmm in the image detected in the combined mode includes image information in focus at all the set values of the focal length. However, the detected image in the combined mode is not necessarily clear since the image information include image information out of focus.

On the other hand, the single-plane detected image Ims by the single-plane-image-detecting operation Cms can provide a clear image at the set focal length.

Accordingly, in the combined mode, the multi-plane-image-detecting operation Cmm can provide the same results as a typical multi-plane mode and the single-plane-image-detecting operation Cms can provide such a high image-quality as having been unobtainable by a typical multi-plane-image-detecting operation Cmm.

A typical frame-by-frame mode requires repetition of the single-plane-image-detecting operation Cms by the set number of the focal length, so that the image detection time is prolonged as the set number of the focal length is increased. In contrast, the combined mode in the exemplary embodiment can reduce the number (the number of the frame nf) of the single-plane-image-detecting operation Cms to shorten the image detection time. In other words, when an image detection in a typical frame-by-frame mode is performed at five values of the focal length, it takes time to perform the single-plane-image-detecting operation Cms on each of five frames. In contrast, in the combined mode, for instance, when the image detection is performed at five values of the focal length, in which a clear image is required at only two of the five values of the focal length, it is only necessary to obtain image information at the five values of the focal length by the multi-plane-image-detecting operation Cmm and perform the single-plane-image-detecting operation Cms at two values of the focal length. The combined mode can thus be finished in time required for three frames in total.

Thus, the variable focal length lens device 1 in the exemplary embodiment can provide a sufficient image-quality at a plurality of values of the focal length and shorten the image detection time.

In the exemplary embodiment, the image-detection-condition setting unit 711 can select one image detection mode from the single-plane mode, the multi-plane mode, the frame-by-frame mode and the combined mode, and can set the image detection loop depending on the selected image detection mode in the lens controller 6.

Accordingly, any one of the combined mode according to the invention, a typical single-plane mode, a typical multi-plane mode, and a typical frame-by-frame mode can be selected, so that the advantages of the combined mode according to the invention can be obtained, while the same image-detecting operation as a typical one can be reliably performed as needed.

The variable focal length lens device 1 in the exemplary embodiment includes a variable focal length lens in a form of a combination of the liquid lens unit 3 whose refractive index is varied in response to the inputted drive signal and the objective lens 2 disposed on an optical axis A coaxial with the liquid lens unit 3.

With this arrangement, a basic image can be formed by the objective lens 2 and the focal length can be varied by the liquid lens unit 3. The use of the liquid lens unit 3 thus eliminates a mechanical means for varying the focal length, so that a structure of the device can be simplified. The liquid lens unit 3 can periodically vary the focal length at a speed as high as several tens kilohertz and can easily provide the multi-plane detected image Imm in which images at a plurality of values of the focal length are superimposed. Accordingly, the liquid lens unit 3 is the most suitable for the variable focal length lens according to the invention.

Modification(s)

It should be understood that the scope of the invention is not limited to the above-described exemplary embodiment(s) but includes modifications and improvements falling within the scope of the invention.

In the above exemplary embodiment, the combined mode is a combination of one multi-plane-image-detecting operation Cmm and one or two single-plane-image-detecting operation Cms. However, the combined mode only needs to include at least one multi-plane-image-detecting operation Cmm and at least one single-plane-image-detecting operation Cms. The number of each of the multi-plane-image-detecting operation Cmm and the single-plane-image-detecting operation Cms can be set as needed.

For instance, in some embodiments, when it is difficult to set too many focal points in only one multi-plane-image-detecting operation Cmm, the focal points np is set in two or more multi-plane-image-detecting operations Cmm. Moreover, in some embodiments, the number of the frame nf in the single-plane-image-detecting operation Cms is also set depending on the number of the focusing surface requiring a bright and clear image. Herein, as exemplarily shown in FIG. 23, when the focusing surface P3 corresponding to the portion 93 interposed between two portions 91, 92 is selected, two boundaries I94, I95 (see FIG. 24) can be detected by one single-plane-image-detecting operation Cms. Moreover, an appropriate setting for selecting the focusing surface in the single-plane-image-detecting operation Cms can further improve an efficiency for the image detection.

In the above exemplary embodiment, the image-detection-condition setting unit 711 can select one image detection mode from the single-plane mode, the multi-plane mode, the frame-by-frame mode and the combined mode. However, the image detection modes except for the combined mode are optional and one of the single-plane mode, the multi-plane mode, and the frame-by-frame mode is omitted as needed in some embodiments.

In the above exemplary embodiment, the variable focal length lens of the variable focal length lens device 1 is in a form of a combination of the liquid lens unit 3 and the objective lens 2. However, the scope of the invention is not limited to the above structure of the variable focal length lens. Any variable focal length lens based on other principles is usable.

What is claimed is:

1. A variable focal length lens device comprising:
   a variable focal length lens configured to periodically vary a focal length;
   an image detector configured to execute an image detection of a measurement target through the variable focal length lens;
   a lens controller configured to control the image detector to execute the image detection on a basis of image detection conditions regarding the focal length of the variable focal length lens; and
   an image-detection-condition setting unit configured to set the image detection conditions in the lens controller, wherein
   the image-detection-condition setting unit is configured to set, as the image detection conditions, a combined mode of repeating an image detection loop comprising at least one multi-plane-image-detecting operation and at least one single-plane-image-detecting operation,
   in the multi-plane-image-detecting operation, the image-detection-condition setting unit is configured to set a plurality of values of the focal length, at each of which the image detection is performed, in one cycle in which the focal length of the variable focal length lens is varied, and
   in the single-plane-image-detecting operation, the image-detection-condition setting unit is configured to set a single value of the focal length, at which the image detection is performed, in one cycle in which the focal length of the variable focal length lens is varied.

2. The variable focal length lens device according to claim 1, wherein
   the image-detection-condition setting unit is configured to select one of a plurality of image detection modes and set the selected one in the lens controller,
   the image detection modes include the combined mode, a single-plane mode, a multi-plane mode, and a frame-by-frame mode,
   in the single-plane mode, an image detection loop comprising only the single-plane-image-detecting operation in which the single value of the focal length is specified is repeatedly executed,
   in the multi-plane mode, an image detection loop comprising only the multi-plane-image-detecting operation in which the plurality of values of the focal length are specified is repeatedly executed, and
   in the frame-by-frame mode, an image detection loop comprising a plurality of the single-plane-image-detecting operations in which the values of the focal length are different from each other is repeatedly executed.

3. The variable focal length lens device according to claim 1, wherein
   the variable focal length lens comprises: a liquid lens unit whose refractive index is varied in response to an inputted drive signal; and an objective lens disclosed on an optical axis coaxial with the liquid lens unit.

4. A method of controlling a variable focal length lens device,
   the variable focal length lens device comprising:
   a variable focal length lens configured to periodically vary a focal length;

an image detector configured to execute an image detection of a measurement target through the variable focal length lens;

a lens controller configured to control the image detector to execute the image detection on a basis of image detection conditions regarding the focal length of the variable focal length lens; and an image-detection-condition setting unit configured to set the image detection conditions in the lens controller, the method comprising:

as the image detection conditions, setting a combined mode of repeating an image detection loop comprising at least one multi-plane-image-detecting operation and at least one single-plane-image-detecting operation;

in the multi-plane-image-detecting operation, setting a plurality of values of the focal length, at each of which the image detection is performed, in one cycle in which the focal length of the variable focal length lens is varied; and in the single-plane-image-detecting operation, setting a single value of the focal length, at which the image detection is performed, in one cycle in which the focal length of the variable focal length lens is varied.

\* \* \* \* \*